US011939056B2

United States Patent
Kennedy et al.

(10) Patent No.: US 11,939,056 B2
(45) Date of Patent: Mar. 26, 2024

(54) DEVICE INSTALLATION SYSTEMS, METHODS, AND MEDIA FOR PROVIDING UBIQUITOUS CONNECTIVITY IN OUTDOOR ENVIRONMENTS

(71) Applicant: Google LLC, Mountain View, CA (US)

(72) Inventors: Thomas Kennedy, Brooklyn, NY (US); Craig Nevill-Manning, New York, NY (US); Amanda Meurer, Brooklyn, NY (US); Veronica Pinchin, New York, NY (US); Daniel Riegel, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 1113 days.

(21) Appl. No.: 16/740,129

(22) Filed: Jan. 10, 2020

(65) Prior Publication Data

US 2020/0223548 A1 Jul. 16, 2020

Related U.S. Application Data

(60) Provisional application No. 62/790,887, filed on Jan. 10, 2019.

(51) Int. Cl.
*B64C 39/02* (2023.01)
*G08G 5/00* (2006.01)
*B64U 101/60* (2023.01)

(52) U.S. Cl.
CPC ......... *B64C 39/024* (2013.01); *G08G 5/0013* (2013.01); *G08G 5/0069* (2013.01);
(Continued)

(58) Field of Classification Search
CPC .. B64C 39/024; G08G 5/0069; G08G 5/0013; B64U 2201/10; B64U 2101/60
See application file for complete search history.

(56) References Cited

U.S. PATENT DOCUMENTS 11,133,708 B1 * 9/2021 Parikh ................... H04B 5/0093
11,377,233 B1 * 7/2022 Cook ...................... B64F 1/007
(Continued)

FOREIGN PATENT DOCUMENTS

EP          3228533 A1 * 10/2017 ............. B64C 1/061
WO     WO-2005122686 A2 * 12/2005 ............. B60R 11/02

OTHER PUBLICATIONS

International Search Report and Written Opinion dated Apr. 21, 2020 in International Patent Application No. PCT/US2020/013173, pp. 1-17.

*Primary Examiner* — Benjamin P Lee
(74) *Attorney, Agent, or Firm* — Lerner David LLP

(57) ABSTRACT

Device installation systems, methods, and media for providing ubiquitous connectivity in outdoor environments are provided. In some embodiments, a device installation system comprises: a host connector that includes a controller, a host power subsystem, a host communication subsystem, and a lock; and a client connector that is connected to a client device and that is connected to the host connector, wherein the client connector includes a client power subsystem, a client communication subsystem, and a latch; wherein the host power subsystem is connected to a power source, the client power subsystem is charged by the host power subsystem of the host connector, and the client power subsystem transmits power to the client device; wherein the controller is configured to transmit a locking instruction to the lock that causes the lock of the host connector to actuate with the latch of the client connector; and wherein the client communication subsystem is configured to communicate with the client device such that data from the client device can be communicated over a communications network.

20 Claims, 25 Drawing Sheets

(52) U.S. Cl.
CPC ...... *B64U 2101/60* (2023.01); *B64U 2201/10* (2023.01); *B64U 2201/20* (2023.01)

(56) References Cited

U.S. PATENT DOCUMENTS

| | | | |
|---|---|---|---|
| 2008/0061924 A1 | 3/2008 | Labowicz et al. | |
| 2010/0225266 A1 | 9/2010 | Hartman | |
| 2014/0062397 A1 | 3/2014 | Dyer et al. | |
| 2016/0300187 A1 | 10/2016 | Kashi et al. | |
| 2016/0347186 A1 | 12/2016 | Schnarr | |
| 2018/0039286 A1* | 2/2018 | Tirpak | G05D 1/0676 |
| 2018/0072170 A1 | 3/2018 | Evans | |
| 2018/0074518 A1* | 3/2018 | Cantrell | G06Q 10/06311 |
| 2018/0105055 A1 | 4/2018 | Chai et al. | |
| 2018/0215280 A1 | 8/2018 | Lee | |
| 2018/0269728 A1* | 9/2018 | Liu | H02J 50/12 |
| 2018/0354649 A1* | 12/2018 | Ortiz | B64C 39/024 |
| 2019/0122455 A1* | 4/2019 | Howard | G05D 1/0202 |
| 2019/0165448 A1* | 5/2019 | Polehn | H01Q 1/1221 |
| 2020/0011487 A1* | 1/2020 | Creusen | F21V 17/105 |
| 2020/0014247 A1* | 1/2020 | Avestruz | H02J 50/12 |
| 2020/0227946 A1* | 7/2020 | Mao | H02J 50/12 |
| 2021/0167631 A1* | 6/2021 | Sato | H02J 7/02 |
| 2021/0269174 A1* | 9/2021 | Shuff | G08G 5/0069 |
| 2022/0289377 A1* | 9/2022 | Aaron | G05D 1/0094 |

\* cited by examiner

DEVICE INSTALLATION SYSTEMS, METHODS, AND MEDIA FOR PROVIDING UBIQUITOUS CONNECTIVITY IN OUTDOOR ENVIRONMENTS

CROSS-REFERENCE TO RELATED APPLICATIONS

This application claims the benefit of U.S. Provisional Patent Application No. 62/790,887, filed Jan. 10, 2019, which is hereby incorporated by reference herein in its entirety.

TECHNICAL FIELD

The disclosed subject matter relates to device installation systems, methods, and media for providing ubiquitous connectivity in outdoor environments.

BACKGROUND

Many urban environments have lighting devices or lamps, wireless access points, cellular nodes, environmental sensors, traffic or public safety cameras, and other devices that are mounted to public infrastructure, such as light poles or utility poles. Installing new devices within such an urban environment requires significant planning, effort, and disruption to street life and requires significant expense as utility poles and other outdoor fixtures were not designed with the intention of adding new devices at a later time.

For example, adding a single vehicle-counting device to an intersection typically requires a municipality to take at least the following steps: 1) shut down a lane of traffic at the intersection until the completion of the installation; 2) dispatch a bucket truck, a maintenance truck, a lift truck, or similar vehicle with multiple staff members to the intersection for the installation of the device; 3) in many instances, devise a makeshift mounting solution involving clamps to adapt to the particular conditions of the utility pole at the given intersection; 4) employ an electrician to shut down the power supply to the utility pole and, in some instances, run a network wire or other communication feeds up the utility pole (e.g., which may involve digging a trench to the nearest connection point); and 5) repeat this labor-intensive process for repairs and/or upgrades to the device.

As this process of deploying new devices is both time consuming and expensive, municipalities have the tendency to invest in high-priced, reliable devices that are expensive to repair and upgrade. Moreover, new devices are typically not even evaluated by these municipalities simply due to the complexities involved in installing one or more of these new devices.

Accordingly, it is desirable to provide new device installation systems, methods, and media for providing ubiquitous connectivity in outdoor environments.

SUMMARY

In accordance with various embodiments, device installation mechanisms (which can include methods, systems, and media) for providing ubiquitous connectivity in outdoor environments are provided.

In accordance with some embodiments of the disclosed subject matter, a device installation system is provided comprising: a host connector that includes a controller, a host power subsystem, a host communication subsystem, and a lock; and a client connector that is connected to a client device and that is connected to the host connector, wherein the client connector includes a client power subsystem, a client communication subsystem, and a latch; wherein the host power subsystem is connected to a power source, the client power subsystem is charged by the host power subsystem of the host connector, and the client power subsystem transmits power to the client device; wherein the controller is configured to transmit a locking instruction to the lock that causes the lock of the host connector to actuate with the latch of the client connector; and wherein the client communication subsystem is configured to communicate with the client device such that data from the client device can be communicated over a communications network.

In some embodiments, the client connector is connected to the client device at an end of the client connector and the client connector is connected to the host connector at an opposing end of the client connector.

In some embodiments, the device installation system further comprises a mast that includes the host connector.

In some embodiments, the device installation system further comprises a hub device that is connected to the mast, wherein the hub device includes the host connector and one or more additional host connectors.

In some embodiments, the host power subsystem receives power from a power source connected through the mast.

In some embodiments, the device installation system further comprises a solar panel connected to the mast, where at least one of the host power subsystem and the client power subsystem receives converted current output from the solar panel.

In some embodiments, each of the host power subsystem and the client power subsystem include a wireless power transceiver, where the wireless power transceiver of the host power subsystem wirelessly charges the wireless power transceiver of the client power subsystem.

In some embodiments, the wireless power transceiver includes an inductive coil assembly, a radio frequency tank circuit, and a tank switching circuit.

In some embodiments, the controller is further configured to detect the presence of the client device and authenticate the client device using the host communication subsystem and the client communication subsystem.

In some embodiments, the controller is further configured to encrypt device information between the host communication subsystem and the client communication subsystem.

In some embodiments, the host connector includes alignment features and the client connector includes corresponding alignment features, where the client device and the client connector are positionally aligned with the host connector in response to positioning the alignment features with the corresponding alignment features.

In some embodiments, the alignment features of the host connector are protruding alignment features and the corresponding alignment features of the client connector are ear-shaped alignment features that, upon positioning, are configured to hang from the protruding alignment features.

In some embodiments, the lock of the host connector comprises a motor and a locking plunger, where the controller is further configured to transmit the locking instruction to the motor that causes the motor to actuate the locking plunger, and where the locking plunger of the host connector engages with the latch of the client connector.

In some embodiments, the locking plunger is recessed within the host controller.

In some embodiments, the device installation system further comprises a failsafe latch that unlocks the latch to remove the client connector and the client device from the host connector.

In some embodiments, the client connector further comprises a drone attachment assembly. In some embodiments, the device installation system further comprises a deployment system that is configured to deploy an unmanned aerial vehicle to provide the client device to the drone attachment assembly of the client connector.

In some embodiments, the device installation system further comprises a mast and a hub device that is connected to the mast, wherein the hub device includes a drone attachment assembly. In some embodiments, the device installation system further comprises a deployment system that is configured to deploy an unmanned aerial vehicle to provide the host connector to the drone attachment assembly of the hub device.

In accordance with some embodiments of the disclosed subject matter, a device installation method is provided, the method comprising: providing a host connector that includes a controller, a host power subsystem, a host communication subsystem, and a lock; and providing a client connector that is connected to a client device and that is connected to the host connector, wherein the client connector includes a client power subsystem, a client communication subsystem, and a latch; wherein the host power subsystem is connected to a power source, the client power subsystem is charged by the host power subsystem of the host connector, and the client power subsystem transmits power to the client device; wherein the controller is configured to transmit a locking instruction to the lock that causes the lock of the host connector to actuate with the latch of the client connector; and wherein the client communication subsystem is configured to communicate with the client device such that data from the client device can be communicated over a communications network.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
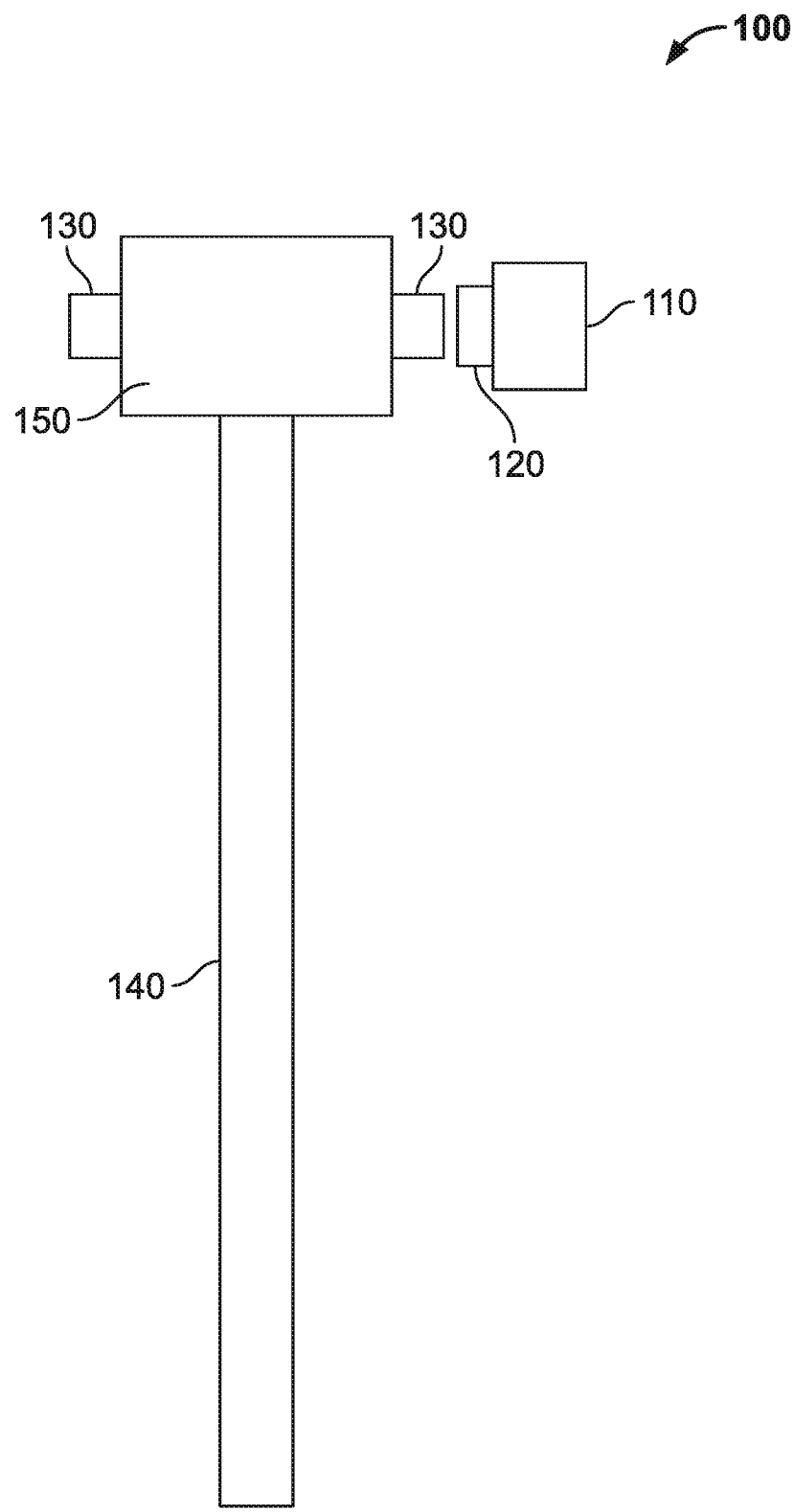
FIG. 1 shows an illustrative example of a device installation system, which may include a hub device, a mast, one or more host interfaces, and one or more client devices, in accordance with some embodiments of the disclosed subject matter.

In accordance with various embodiments, device installation mechanisms (which can include methods, systems, and media) for providing ubiquitous connectivity in outdoor environments are provided.

In some embodiments, the device installation mechanisms can include a system of connectors and infrastructure for installing one or more client devices in an outdoor environment. Generally speaking, the mechanisms include a mechanical connector that connects with one or more client devices (or a client interface that is connected to a client device), while also providing electrical power and communication to the client device.

In some embodiments, the device installation mechanisms can include a host connector and a client-side connector. The host connector, which can be connected to a mast, a building, or any other suitable static structure, can include a host interface that provides a mechanical, communications, and power interface to the client-side connector. The client-side connector, which can be connected to a client device, can include a client side interface that provides a mechanical, communications, and power interface to the client device that is being connected. For example, the client-side connector (which can be connected to a particular client device for installation) can be connected to a host connector (which can be connected to a mast, a building, or any other suitable static structure).

Examples of client devices that can be used with the device installation mechanisms described herein are sensor devices (e.g., an air quality sensing device, a temperature sensing device, a pressure sensing device, a sound or noise sensing device, a light sensing device, a humidity sensing device, etc.), lighting devices, camera or imaging devices (e.g., an outdoor camera, an infrared imaging device, a thermal imaging device, a LIDAR imaging device, etc.), display devices (e.g., an outdoor LED display device, a double-sided display device, etc.), and/or communications devices (e.g., a Wi-Fi access point, a wireless backhaul system, etc.).

In some embodiments, the device installation mechanisms can include a mechanical fastening interface, which can allow for mechanical compliance during installation and provide a secure mounting through its final mounting position. The mechanical fastening interface can, for example, be a portion of the host connector. The client device can then, in some embodiments, be further secured into a mounting position using an electromechanical actuator. For example, in response to receiving a locking command from a system management application via a network management interface, the electromechanical actuator can actuate to lock the client device to the host connector. In a more particular example, in response to a motor receiving a locking command from a controller contained in the host connector, the motor can actuate to cause a locking plunger or a locking pin to extend through a latching assembly on the client connector associated with the client device. This can, for example, prevent theft and provide added mechanical security in high wind conditions.

The device installation mechanisms can be using in any suitable application. For example, in an urban environment having multiple masts in which each mast includes a host interface for receiving a client device having a corresponding client interface, the device installation mechanisms can reduce the installation time, preparation time, and installation cost associated with the installing and/or removing physical client devices in the urban environment.

These and other features are further described in connection with FIGS. 1-15.

Turning to FIG. 1, an illustrative example of a device installation system 100 is shown in accordance with some embodiments of the disclosed subject matter.

In some embodiments, the device installation system 100 can include one or more client devices 110 for installation in an outdoor environment. As described hereinabove, client devices 110 can include any suitable client device, such as a sensor device (e.g., an air quality sensing device, a temperature sensing device, a pressure sensing device, a sound or noise sensing device, a light sensing device, a humidity sensing device, etc.), a lighting device, a camera or imaging device (e.g., an outdoor camera, an infrared imaging device, a thermal imaging device, a LIDAR imaging device, etc.), a display device (e.g., an outdoor LED display device, a double-sided display device, etc.), and/or a communications device (e.g., a Wi-Fi access point, a wireless backhaul system, etc.).

In some embodiments, each client device 110 for installation in system 100 can include a client interface 120. As used herein, client interface 120 can include mechanical, power, and communications to client device 110, where client interface 120 connects with a corresponding host interface 130. For example, as shown in FIG. 1, client interface 120 can provide a mechanical connection with a suitable client device 110. In a more particular example, a previously manufactured client device 110 can be fitted to mechanically and electrically connect to a client interface 120 such that, when connected with a corresponding host interface 130, can provide power and/or communications from host interface 130 to client device 110.

It should be noted that, in some embodiments, different client devices 110 can have different client interfaces 120 and each client interface 120 can connect with a corresponding host interface 130 (e.g., such that there are different host interfaces). For example, client interfaces 120 can be selected for fitting with a client device 110 based on the type of client device—e.g., a communications device, a sensor device, a camera device, a display device, etc., or based on the size or dimensions of the client device.

It should also be noted that, in some embodiments, a client device 110 can be manufactured to include a client interface 120 that, when connected with a corresponding host interface 130, can provide a mechanical connection with the corresponding host interface 130 while transmitting power and/or communications from host interface 130 (which may receive power and/or communications from a building, a nearby access point, etc.) to client device 110.

Generally speaking, each client interface 120 that is associated with a client device 110 can be connected to a corresponding host interface 130. For example, an existing utility pole can be configured to include a host interface 130 for receiving one or more client devices 110. In another example, a mast 140 can be installed at an appropriate location (e.g., a traffic intersection) that includes one or more host interfaces 130 for receiving one or more client devices 110. In yet another example, one or more host interfaces 130 can be installed on a static structure, such as a building located at a particular intersection, to receive one or more client devices 110.

It should be noted that, in some embodiments, a hub device 150 or other device that includes multiple host interfaces 130 can be configured to include multiple different host interfaces, where each host interface can accommodate a different type of client device having an associated client interface. For example, as shown in FIG. 1, a hub device 150 that is mounted on a mast 140 can include two host interfaces 130. In a more particular example, each host interface 130 of hub device 150 can be configured to receive any suitable client device 110. In another particular example, each host interface 130 of hub device 150 can be configured to receive a particular type of client device 110—e.g., a lighting device at host interface 130 on one end of hub device 150 and a sensor device at host interface 130 on the opposing end of hub device 150.

As also shown in FIG. 1, hub device 150 or any other suitable device that includes one or more host interfaces 130 can be mounted on mast 140 or any other suitable structure. For example, hub device 150 that includes one or more host interfaces 130 for connecting with suitable client interfaces on client devices can be installed on a pre-existing light pole, traffic pole, or telephone pole. In another example, alternatively to mast 140 or any other suitable mast-like structure, hub device 150 that includes one or more host interfaces 130 for connecting with suitable client interfaces on client devices can be installed on a static structure, such as a portion of a building.

Figure 5:
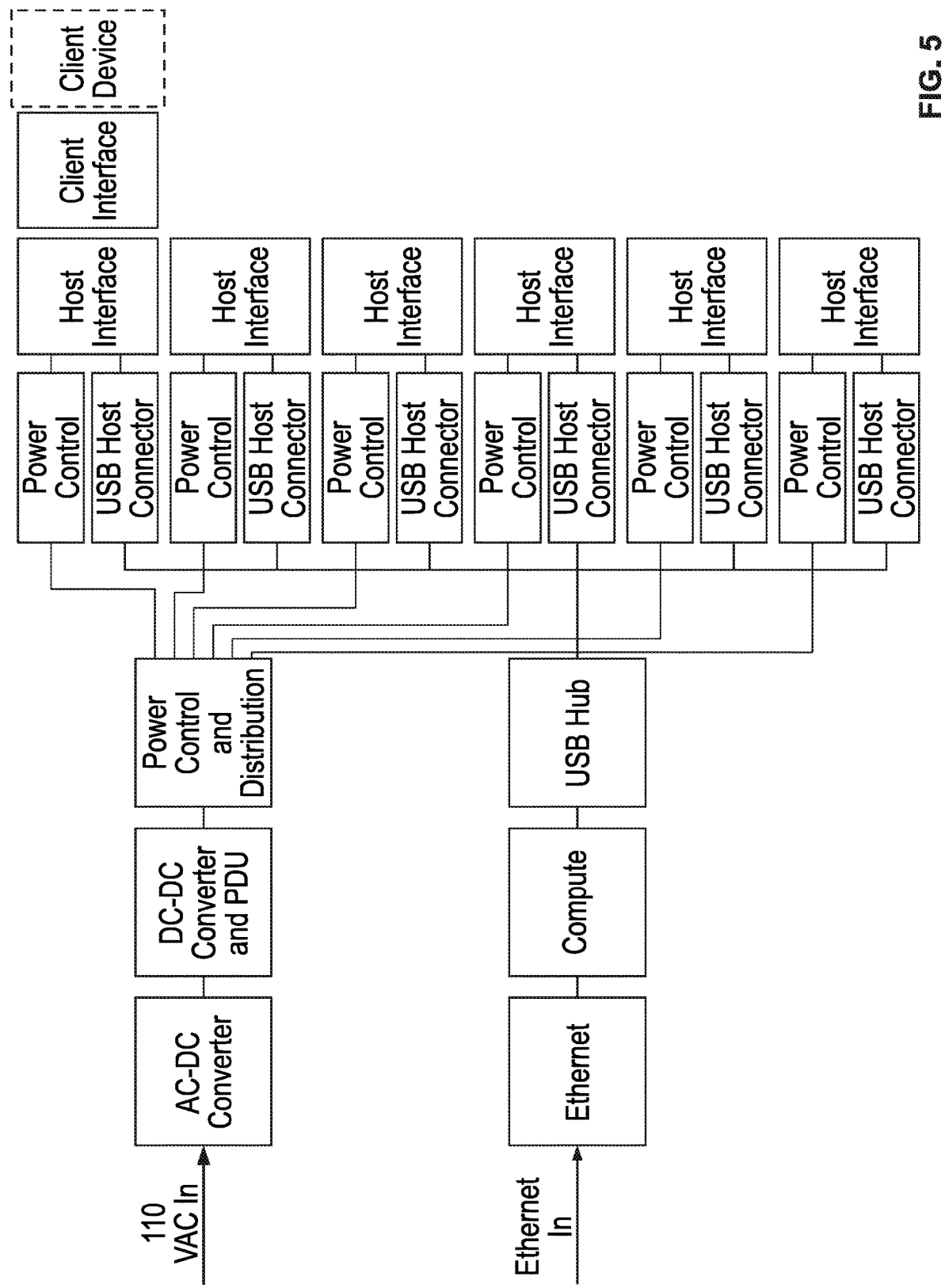
FIG. 5 shows an illustrative example of a hub device that can include one or more host interfaces for receiving one or more client devices each having a client interface in accordance with some embodiments of the disclosed subject matter.

It should be noted that, in some embodiments, hub device 150 can include any suitable number of host interfaces. For example, FIG. 5 shows an illustrative example of a hub device that can include one or more host interfaces for receiving one or more client devices each having a client interface in accordance with some embodiments of the disclosed subject matter. As shown in FIG. 5, hub device 150 can include six host interfaces that can each receive a client device. In a more particular example, hub device 150 can include a host interface that corresponds to a particular type of client device (e.g., a sensor device) and a host interface that corresponds to a different type of client device (e.g., a lighting device). In another more particular example, hub device 150 can include multiple host interfaces of the same type that can accommodate any suitable client device. In yet another example, a host interface that corresponds to a particular type of client device (e.g., a sensor device) can be replaced with a host interface that corresponds to a different type of client device (e.g., a lighting device). In a further example, hub device 150 can accommodate the installation of additional host interfaces—e.g., although hub device 150 of FIG. 1 shows two host interfaces 130, at least two additional host interfaces can be added to hub device 150 on opposing ends of the unallocated portions of hub device 150.

Figure 2:
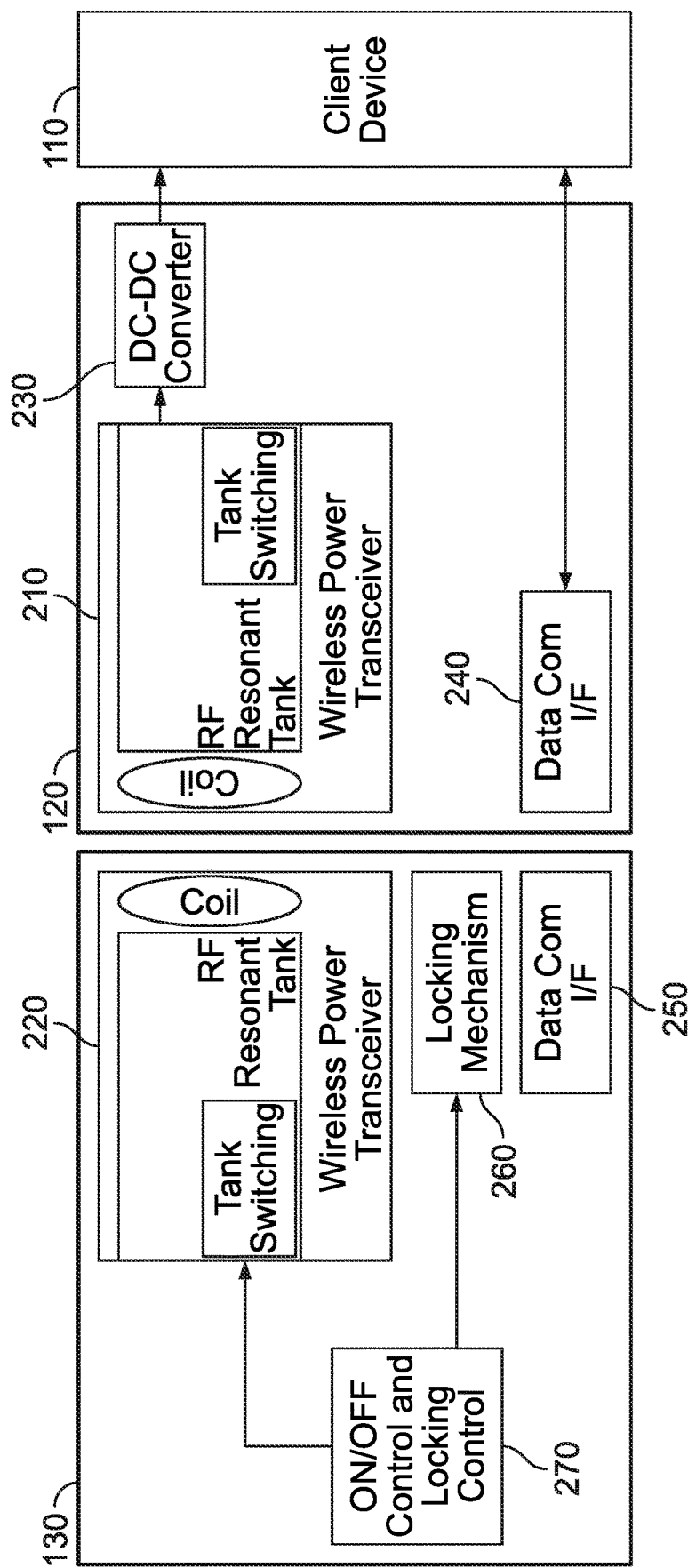
FIG. 2 shows an illustrative example of a client interface and a host interface in accordance with some embodiments of the disclosed subject matter.

Turning to FIG. 2, an illustrative example of client interface 120 and host interface 130 in accordance with some embodiments of the disclosed subject matter is shown. Upon connecting client interface 120 with host interface 130, this can, for example, provide power and connectivity to a client device.

As shown in FIG. 2, a client interface 120 can be connected to a client device 110. For example, client interface 120 can be attached to a pre-existing client device 110. In another example, client interface 120 can be configured to mechanically and electrically connect to client device 110 such that client interface 120 can be physically attached to client device 110 and such that power and/or signals received from a host interface can be transmitted to client device 110 via client interface 120.

In some embodiments, each client interface 120 and host interface 130 can include any suitable power subsystem in which power can be provided to a client device 110 that is connected to client interface 120. More particularly, a power subsystem of client interface 120 can receive power from a power subsystem of host interface 130 and, in turn, the power subsystem of client interface 120 can provide power to a connected client device 110. For example, as shown in FIG. 2, the power subsystem of client interface 120 can include a wireless power transceiver 210 and the power subsystem of host interface 130 can include a corresponding wireless power transceiver 220, where wireless power transceiver 210 and wireless power transceiver 220 can be any suitable bidirectional wireless charging transmitter and receiver circuits. In continuing this example, in response to the power subsystem of host interface 130 receiving power from a power source connected through mast 140 or a static structure, wireless power transceiver 210 of host interface 130 can wirelessly charge wireless power transceiver 220 of client interface 120 and, in turn, wireless power transceiver 220 of client interface 120 can transmit power to a connected client device 110 via a DC-to-DC converter circuit 230.

It should be noted that the power subsystem of client device 110 can receive power from one or more suitable sources. For example, as described above, the power subsystem of client device 110 can receive power from wireless power transceiver 220 of client interface 120, which is charged by wireless power transceiver 210 of host interface 130 in which wireless power transceiver 210 receives power from a power source (e.g., via hub device 150, via hub device 150 through mast 140, etc.). This can, for example, provide power to client devices 110 that may require a substantial amount of power (e.g., greater than 100 watts). In another example, client devices 110 that require a lesser amount of power, such as an air quality sensor, may receive the necessary power from other suitable sources, such as a solar panel that is connected to mast 140 and that charges wireless power transceiver circuit 220 in host interface 130 (e.g., a resonant tank). An illustrative solar panel and power management circuitry within host interface 130 is shown, for example, in FIGS. 13A and 13B. In yet another example, client devices 110 can receive power from one or more batteries or other storage devices within host interface 130, hub device 150, mast 140, or any other suitable portion of device installation system 100. An illustrative battery that is included within hub device 150 at a portion that is central to each of the host interfaces 130 is shown, for example, in FIGS. 13A-13C.

In some embodiments, the power subsystems of client interface 120 and host interface 130 can include suitable power measurement and driver control circuitry for managing (e.g., in instances where multiple power sources are available for providing power to client device 110). For example, power measurement and driver control circuitry within host interface 130 can determine which power source provides power to a connected client device 110. In another example, power measurement and driver control circuitry within host interface 130 can determine power on/off, frequency information, power transmission instructions, etc. In yet another example, power measurement and driver control circuitry within client interface 120 can determine how much power to receive from the power subsystem of a connected host interface 130, client draw information or an amount of power for transmitting to a connected client device 110, etc.

In a more particular example, as shown in FIG. 2, wireless power transceiver circuits 210 and 220 can each include any suitable components, such as a coil assembly (e.g., an inductive coil) and a radio frequency resonant tank circuit (e.g., which may include a tank switching circuit).

Figure 3:
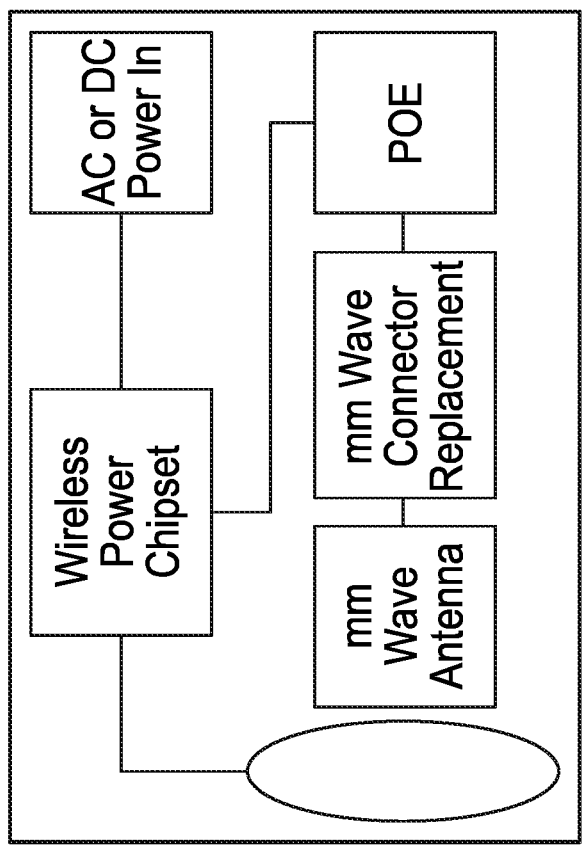
FIG. 3 shows an illustrative example of components within the wireless power transceiver circuits of the client interface and the host interface in accordance with some embodiments of the disclosed subject matter.
Figure 3:
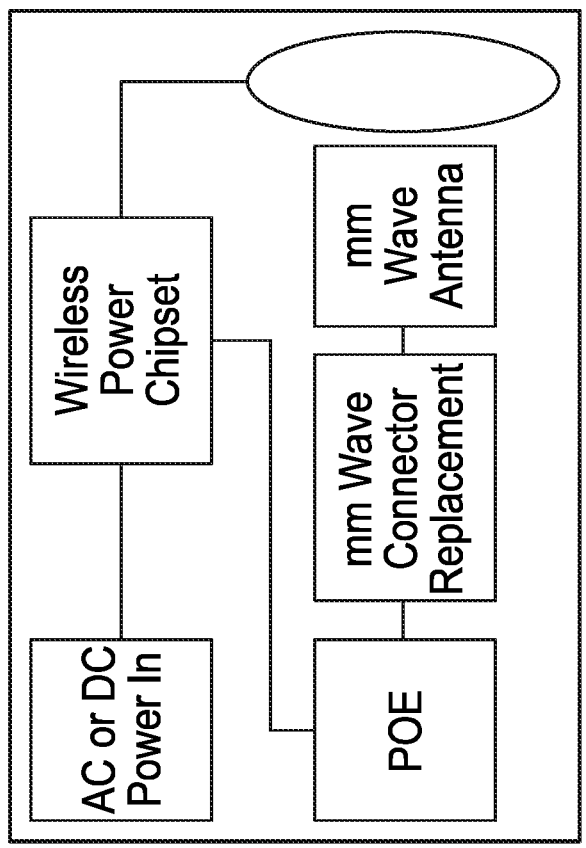
Figure 4A:
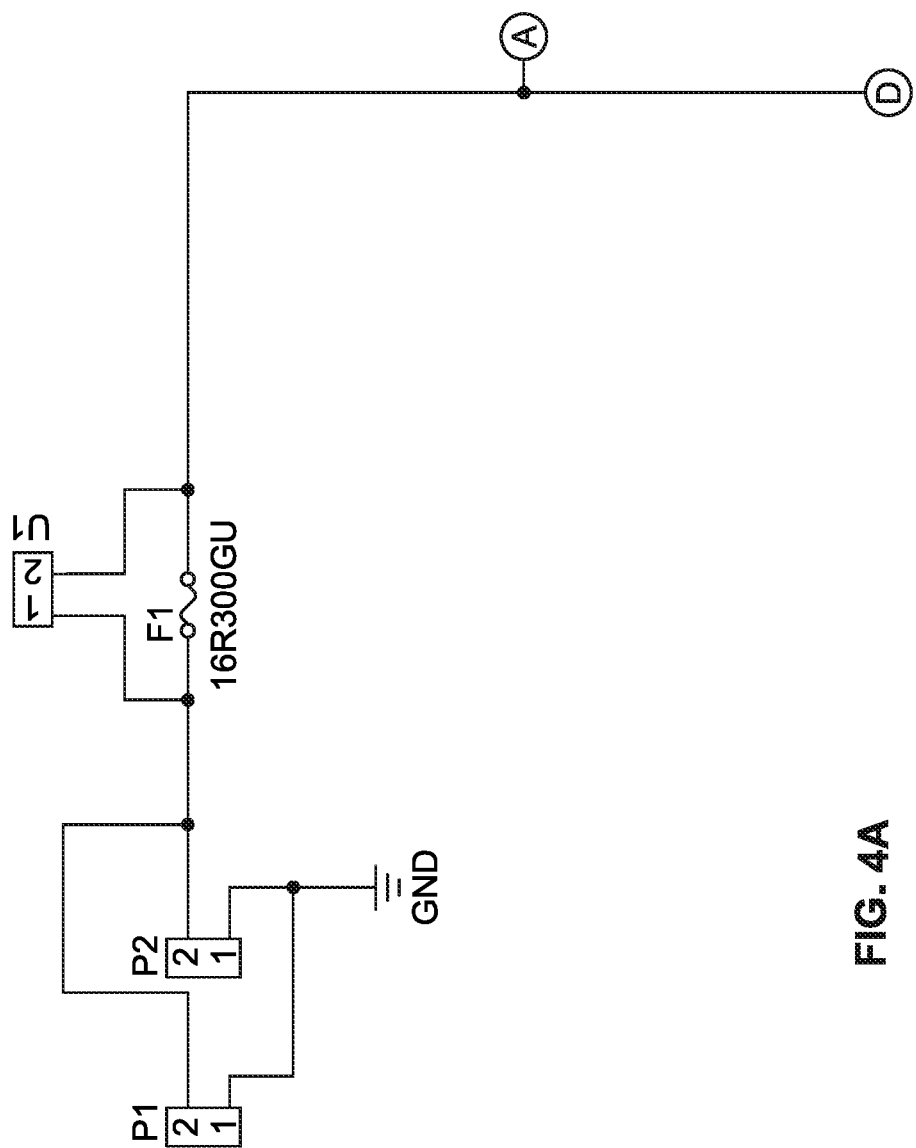
FIGS. 4A-4D show an illustrative wireless power circuit diagram of the client interface and the host interface in accordance with some embodiments of the disclosed subject matter.
Figure 4B:
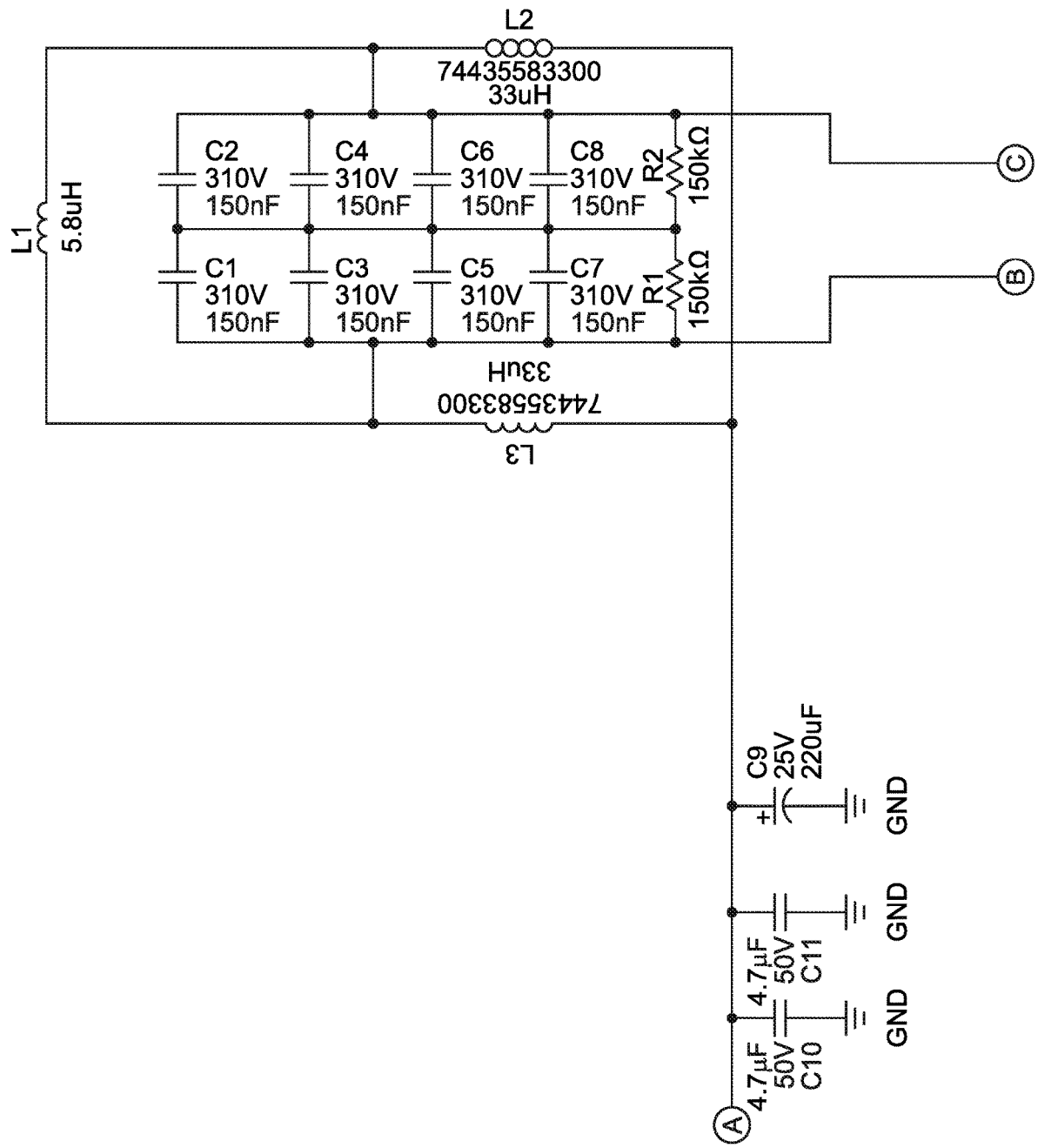
Figure 4C:
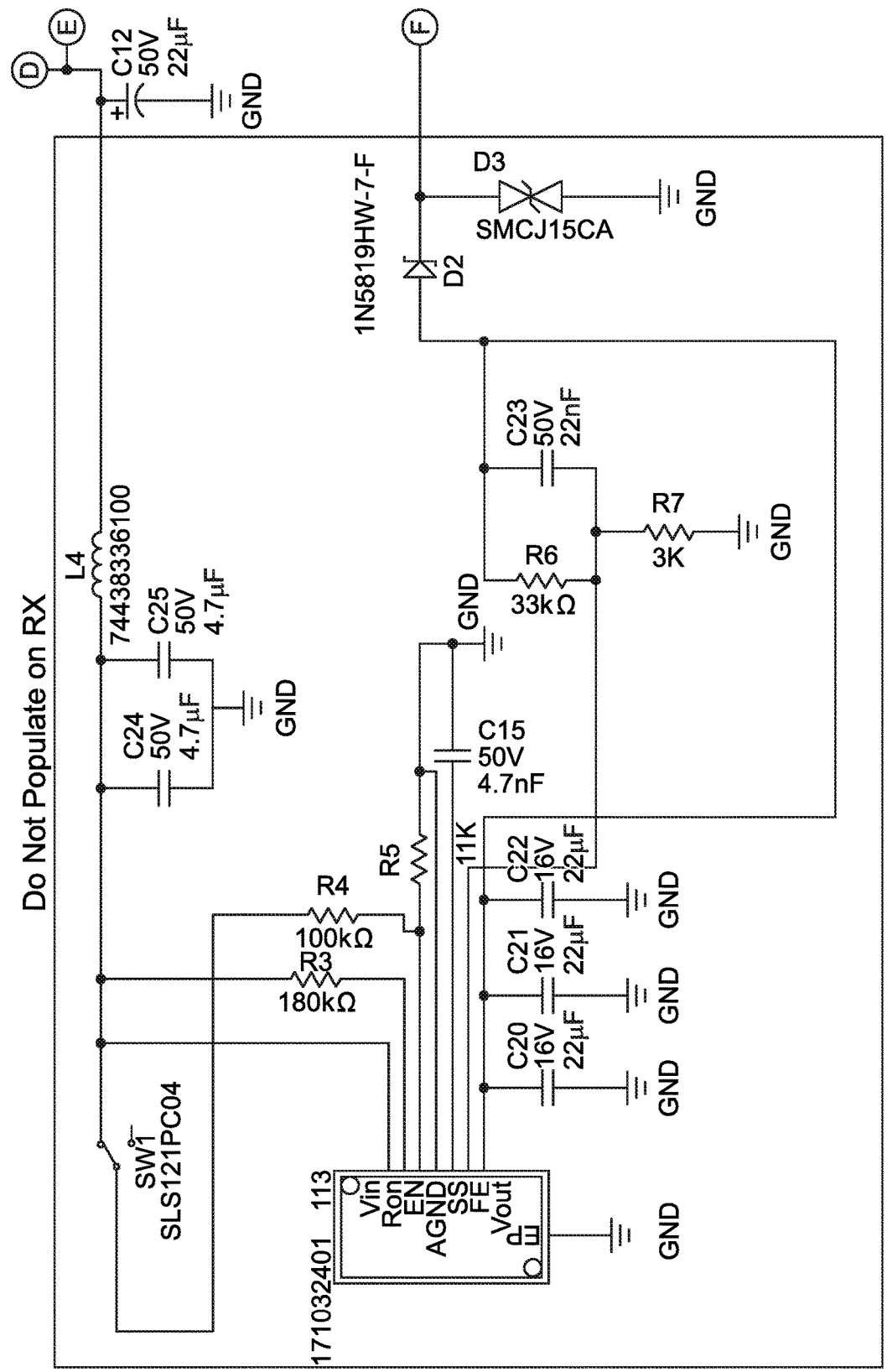
Figure 4D:
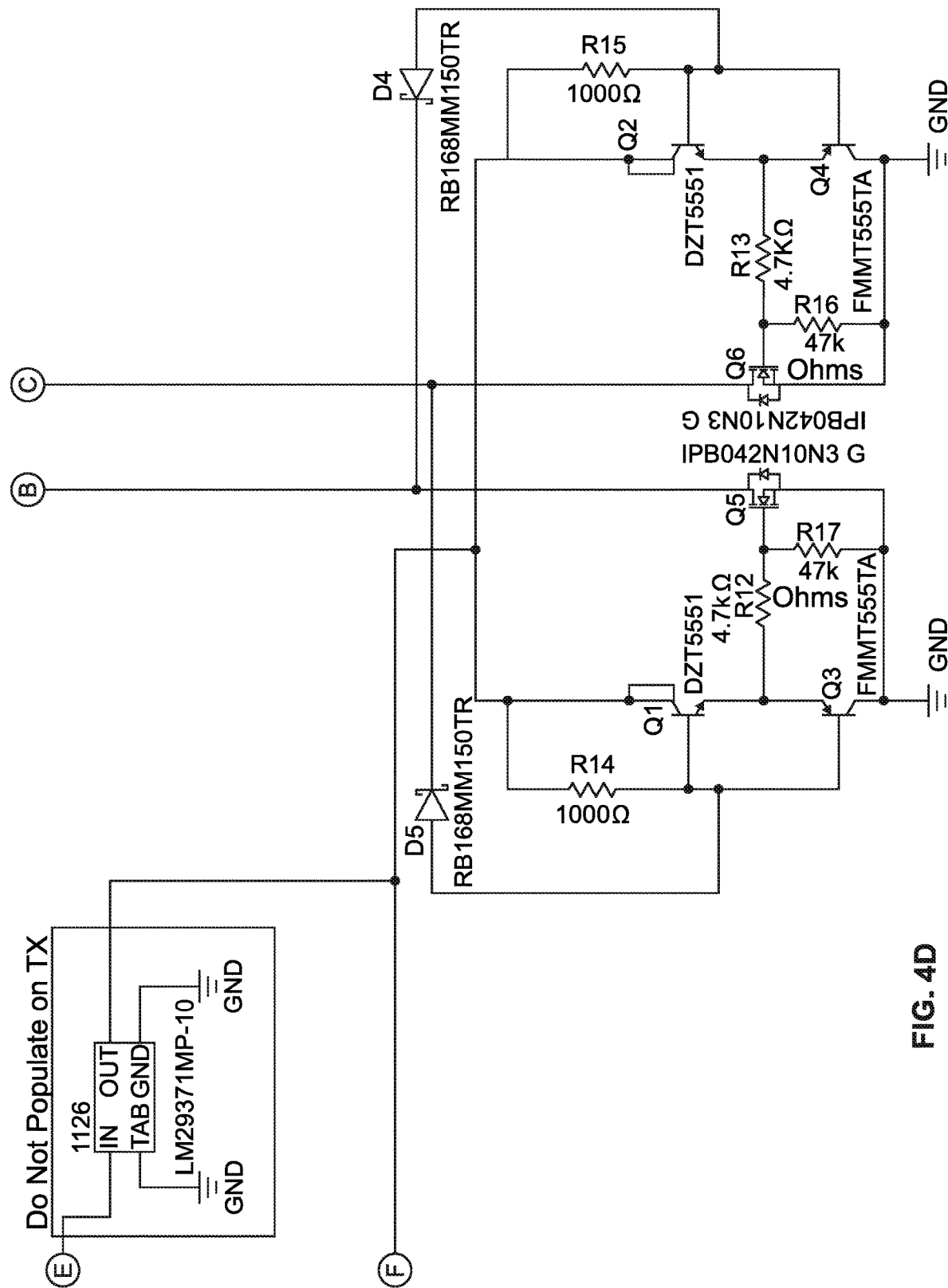

In another more particular example, FIG. 3 shows that wireless power transceiver circuits 210 and 220 can include a wireless power chipset, a millimeter wave antenna, a millimeter wave connector circuit, and a power over ethernet (PoE) connector circuit.

In yet another more particular example, FIGS. 4A-4D show an illustrative wireless power circuit diagram of client interface 120 and host interface 130 in accordance with some embodiments of the disclosed subject matter.

In some embodiments, each client interface 120 and host interface 130 can include any suitable communication subsystem in which data can be transmitted between a communication subsystem 250 of host interface 130 and a communication subsystem 240 of client interface 120, where client device 110 communicates with the communication subsystem 240 of client interface 120. For example, communication subsystem 240 of client interface 120 can be configured to provide network connectivity to client device 110—e.g., such that client device 120 can transmit sensor data (e.g., a count of the number of bicycles crossing an intersection in a given hour) to a sensor database.

For example, in response to client interface 120 with an associated with a client device 110 being connected to host interface 130, device information associated with the client device 110 (e.g., device name, address information, device type, device capabilities, device requirements, etc.) can be transmitted to the communication subsystem of host interface 130. In a more particular example, the communication subsystem of host interface 130 can authenticate the client device 120 that has been connected via client interface 120. For example, the controller of host interface 130 can receive device information associated with the client device to authenticate the client device. In another more particular example, the communications transmitted between the communication subsystem of client interface 120 and the communication subsystem of host interface 130 can be encrypted. For example, upon authenticating the client device, communications, such as sensor data, transmitted between the communication subsystem of client interface 120 and the communication subsystem of host interface 130 can be encrypted.

In some embodiments, each client interface 120 and host interface 130 can include corresponding mechanical subsystems in which a mechanical connection is made between host interface 130 and client interface 120 having a connected client device 110.

For example, referring back to FIG. 2, host interface 130 can include a locking mechanism 260 that receives a locking instruction from a controller or any other suitable processing device 270. In a more particular example, in response to detecting and/or authenticating a client device 110 that has been connected to host interface 130 via client interface 120, a management system can transmit a locking instruction that actuates locking mechanism 260 that securely mounts a client device 110 and its associated client interface 120 to host interface 130 that may be located on a mast 140 or any other suitable static structure. In another more particular example, as shown in FIG. 10G, in response to a motor 1070 receiving a locking command from a controller contained in the host connector, the motor 1070 can actuate to cause a locking plunger 1080 (or a locking pin) to extend through a latch assembly 1090 on the client connector associated with the client device. This locking mechanism can, for example, provide a secure mounting through its final mounting position and provide a level of security that prevents theft and added mechanical security (e.g., in high wind conditions, to secure a client device from falling from a mast, etc.).

In a more particular example, locking mechanism 260 can include an electromechanical actuator. In response to a device installation management system transmitting a locking instruction to locking mechanism 260 via a networked management interface (e.g., from a mobile device executing a device installation application that is associated with an authorized installer of a client device, from an administrative user associated with a server executing a device installation application, etc.), locking mechanism 260 can cause an electromechanical actuator to connect and lock with a portion of the mechanical subsystem in client interface 120.

Figure 6:
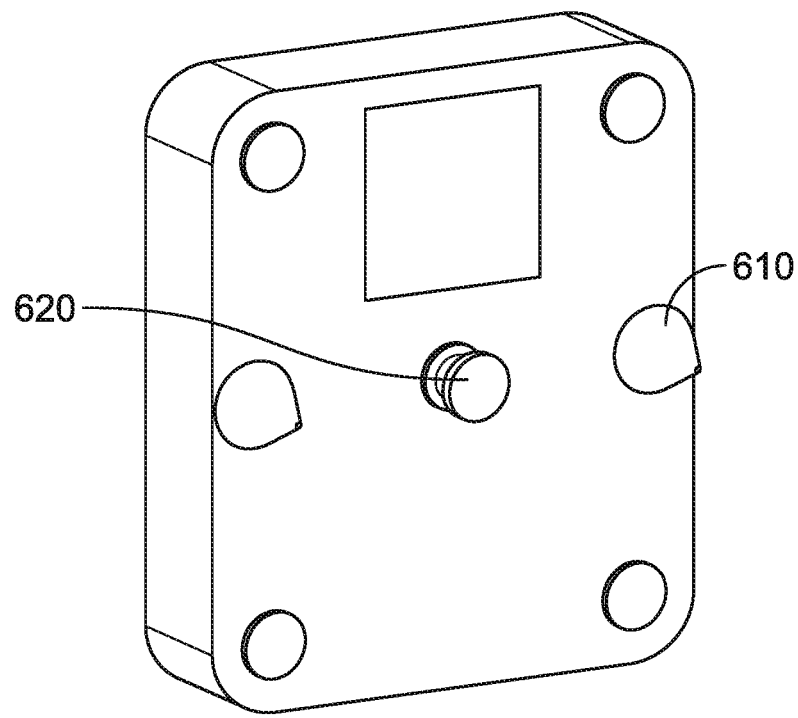
FIG. 6 shows an illustrative example of a puck element of a host interface for mechanically attaching the host interface with a client interface in accordance with some embodiments of the disclosed subject matter.

Turning to FIG. 6, the mechanical subsystem of host interface 130 can include a puck element 600, where host interface 130 including one or more puck elements 600 can be mounted on a utility pole, mast (e.g., mast 140), or any other suitable static structure.

As shown in FIG. 6, puck element 600 can include alignment features 610 and a latch 620. Puck element 600 can include any suitable alignment features so that a client device 110 having a client interface 120 can be aligned to connect with puck element 600 of host interface 130. In addition, puck element 600 can include any suitable latch or latching mechanism so that a client device 110 having a client interface 120 can be attached to host interface 130.

Figure 7:
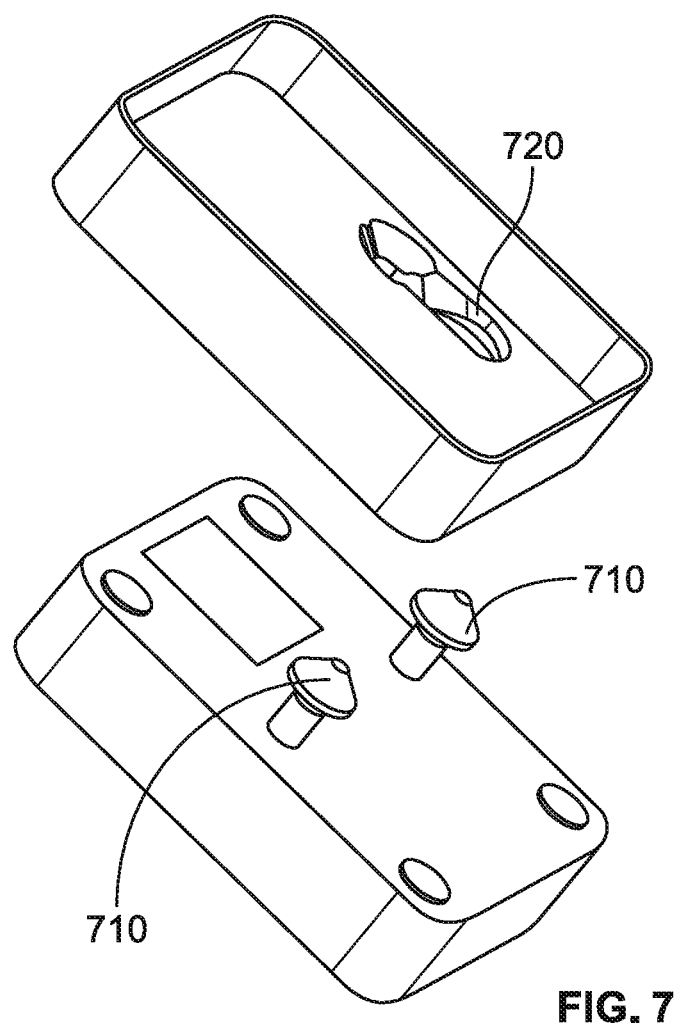
FIG. 7 shows an illustrative example of a puck element of a host interface that includes latches that connected with corresponding openings on a client interface in accordance with some embodiments of the disclosed subject matter.
Figure 8:
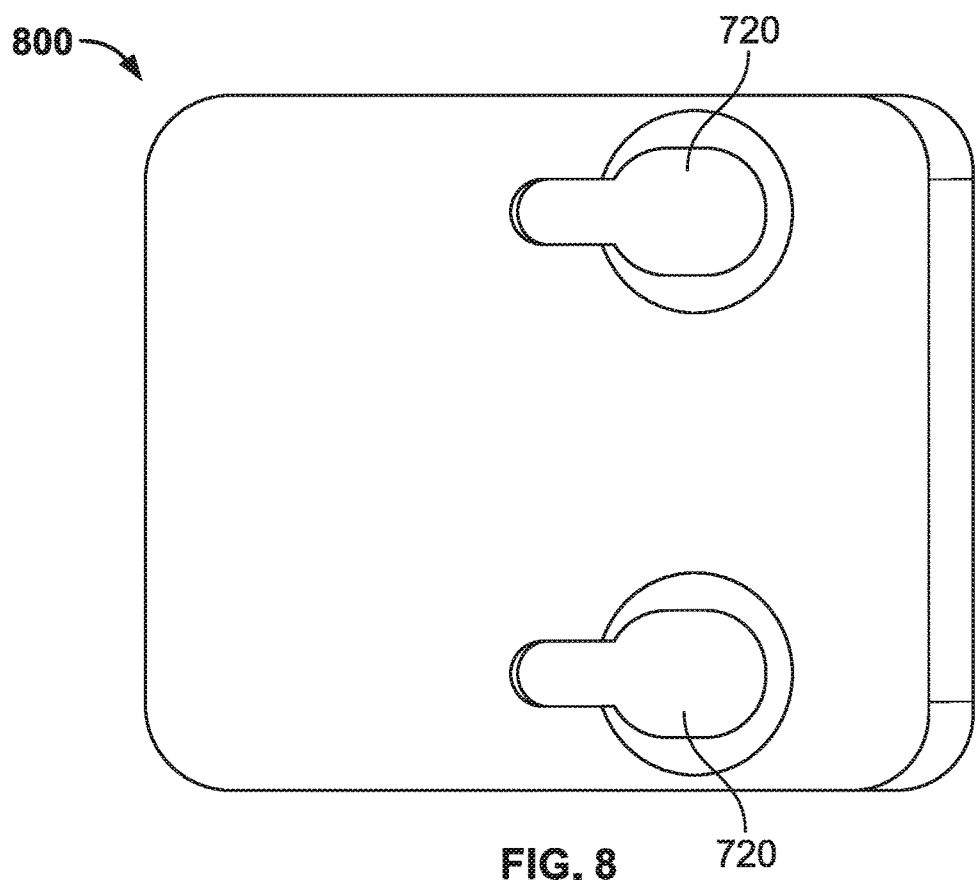
FIG. 8 shows an illustrative example of an alignment plate having corresponding openings on a client interface in accordance with some embodiments of the disclosed subject matter.
Figure 9:
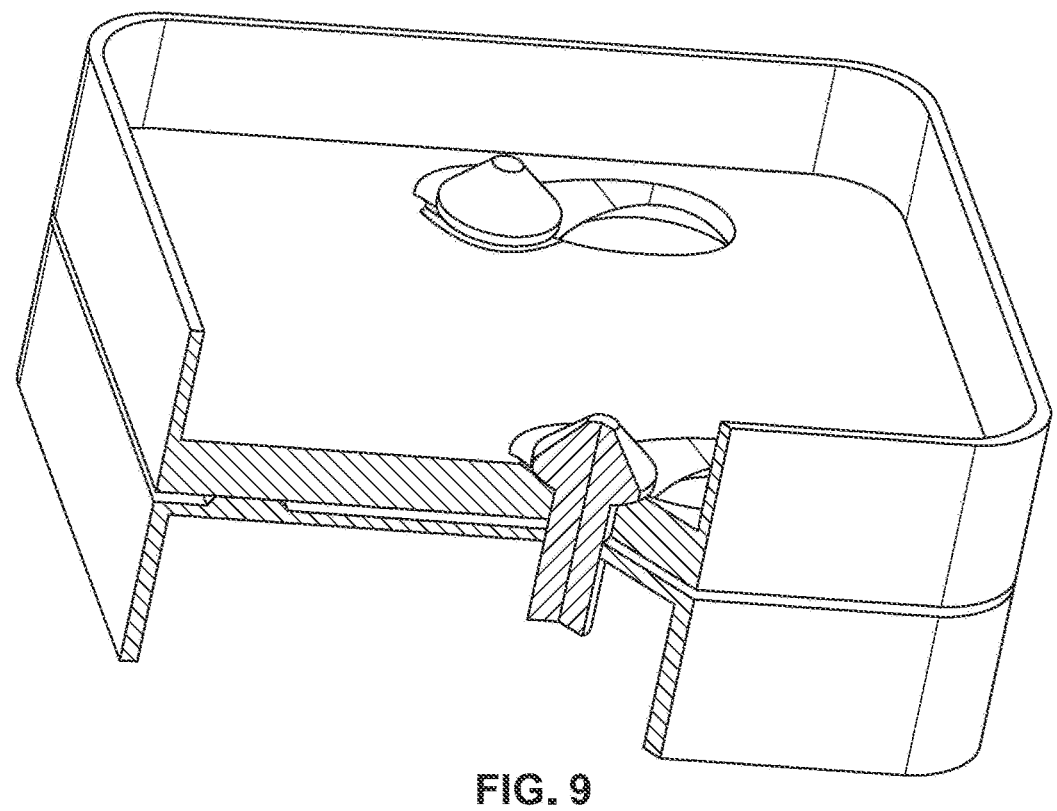
FIG. 9 shows an illustrative example of the latches of a puck element of a host interface that align and connect with corresponding openings on a client interface in accordance with some embodiments of the disclosed subject matter.

As shown in FIGS. 6 and 7, the alignment features and the latch can have any suitable shape. For example, as shown in FIG. 7, latches 710 can be formed on puck element 600 to both align and connect with corresponding openings 720 on the mechanical subsystem of client interface 120. An illustrative example of an alignment plate of client interface 120 is shown in FIG. 8, where latches 710 of puck element 600 in host interface 130 can align and connect with corresponding openings 720 of alignment plate 800. An illustrative example of alignment features 600 of host interface 130 being aligned and connected with corresponding openings 720 of alignment plate 800 is shown in FIG. 9.

It should be noted that, in some embodiments, puck element 600 and its components can be positioned at any suitable angle. For example, as shown in FIG. 7, puck element 600 is positioned at an angle of about 45 degrees, which may allow for shedding of debris and which may allow an unlatched device or portion of a device to rest securely against puck element 600.

Figure 10B:
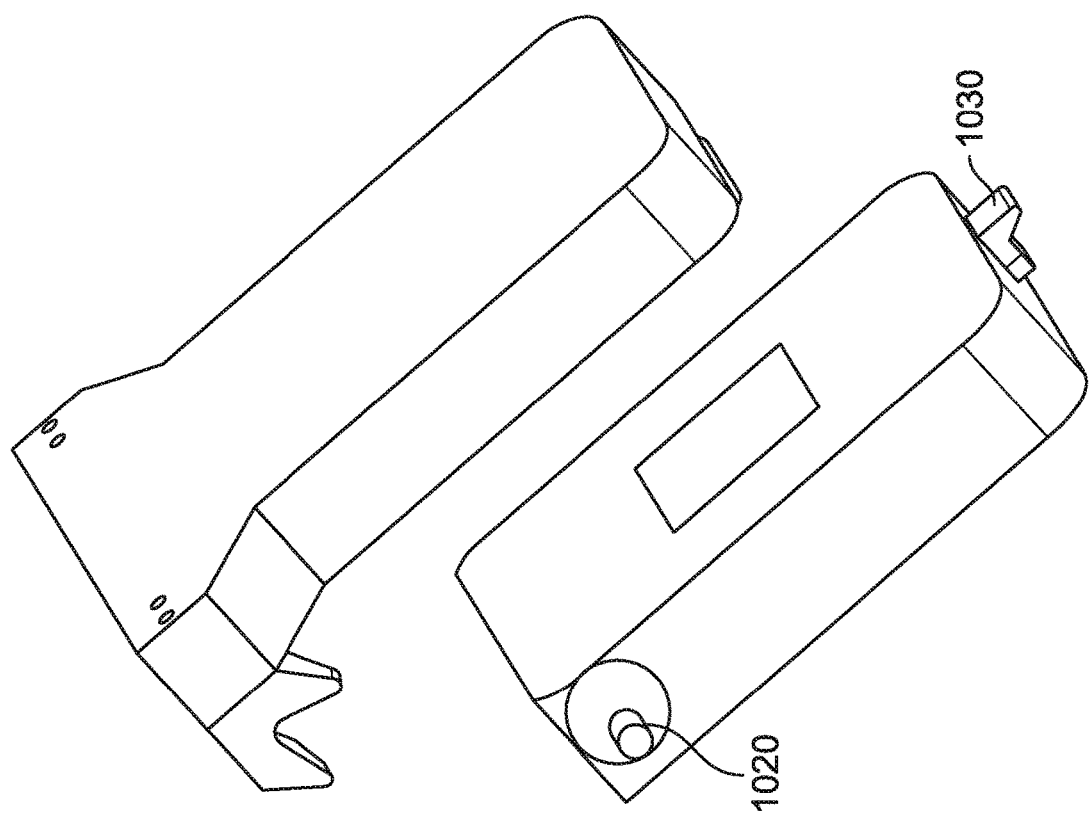
FIGS. 10A-10G show illustrative examples of alignment features and a latch for aligning and connecting a host interface with a client interface in accordance with some embodiments of the disclosed subject matter.
Figure 10A:
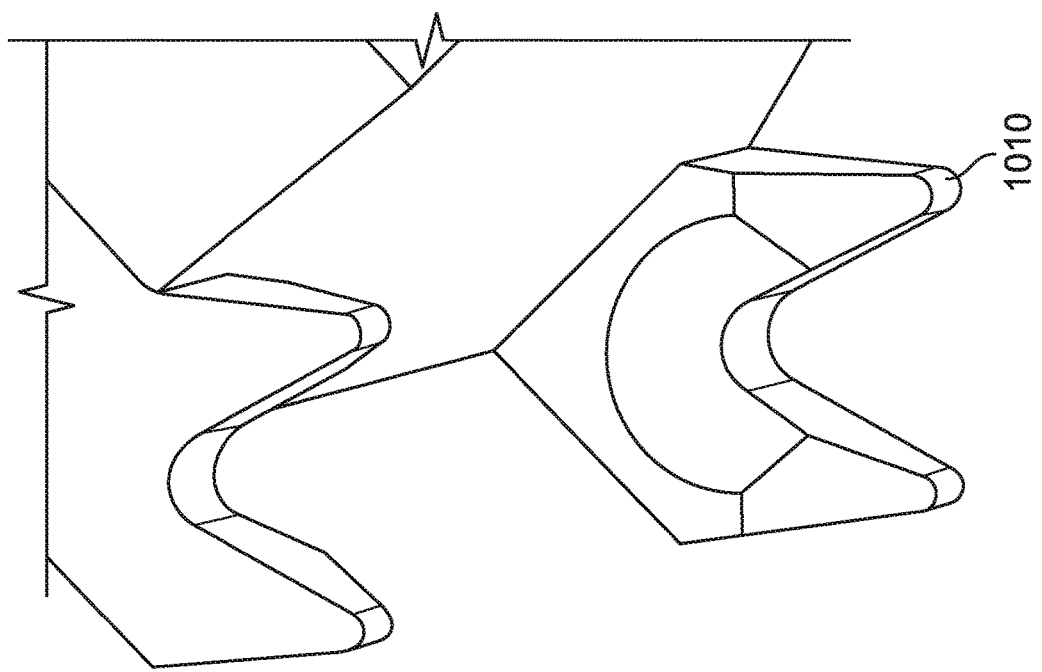
Figure 10C:
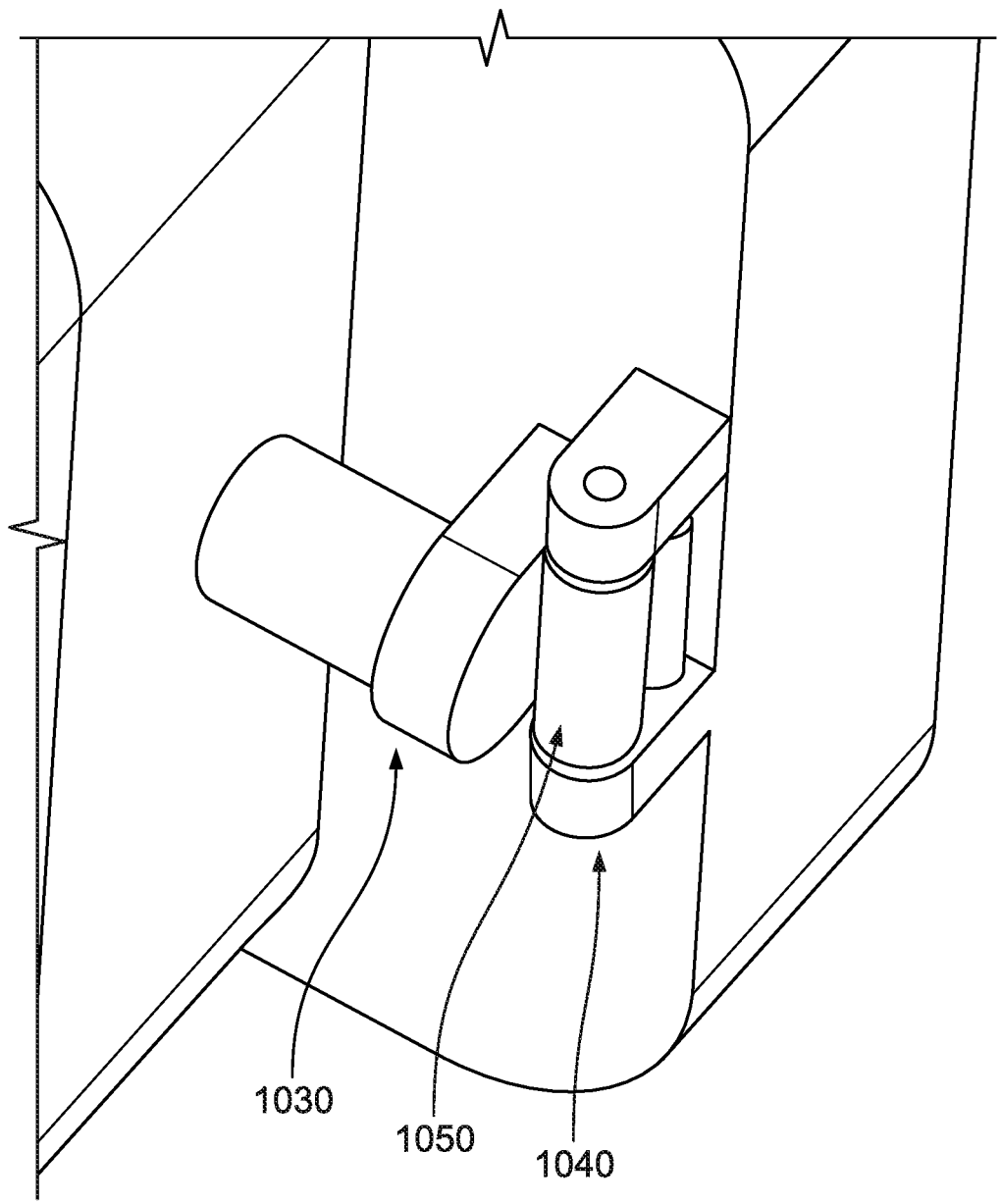

As shown in FIGS. 10A and 10B, the mechanical subsystem of client interface 120 can include alignment features 1010 that align and transfer load of client device 110 to puck element 600 and the mechanical subsystem of host interface 130 that include ear-shaped alignment features 1020. Upon connecting alignment features 1010 on client interface 120 with ear-shaped alignment features 1020 that protrude from puck element 600 of host interface 130, client device 110 can hang from ear-shaped alignment features 1020. In turn, a latch 1030 positioned at a base portion of puck element 600 can actuate to connect with a corresponding latch element 1040 on client interface 120. For example, as shown in FIG. 10C, latch 1020 can linearly actuate away from the base portion of puck element 600 to connect with corresponding latch element 1040 of client interface 120. In some embodiments, as also shown in FIG. 10C, latch element 1040 of client interface 120 can include a roller element 1050. Roller element 1050 can, for example, reduce friction when latching and/or otherwise connecting client interface 120 (and its associated client device) with host interface 130.

Figure 10D:
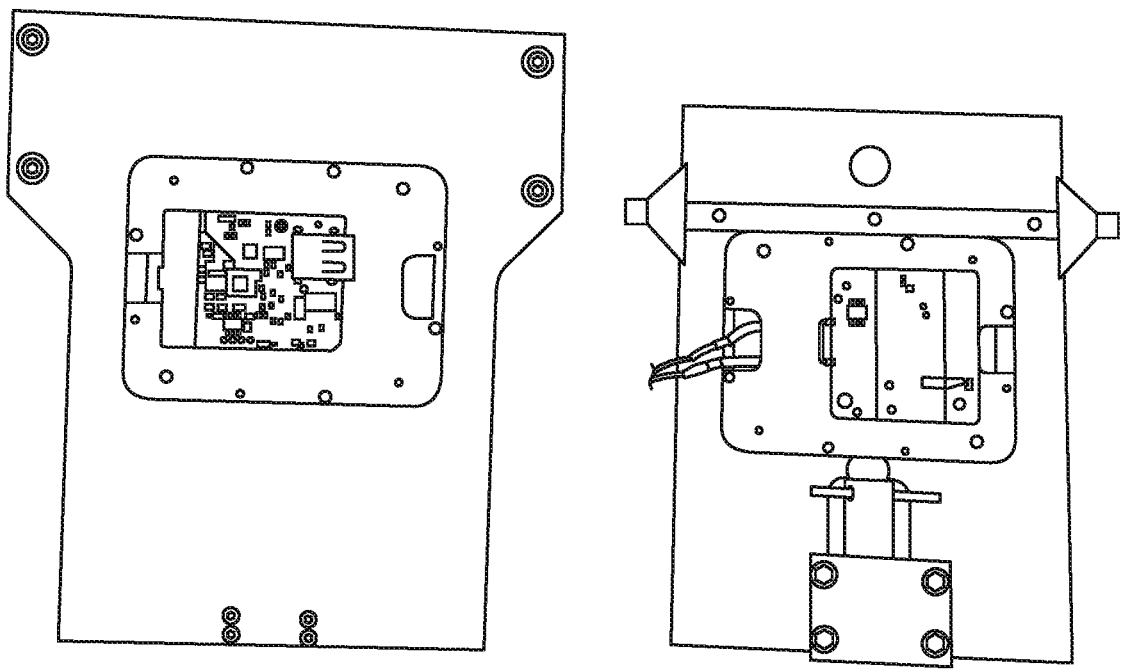
Figure 10E:
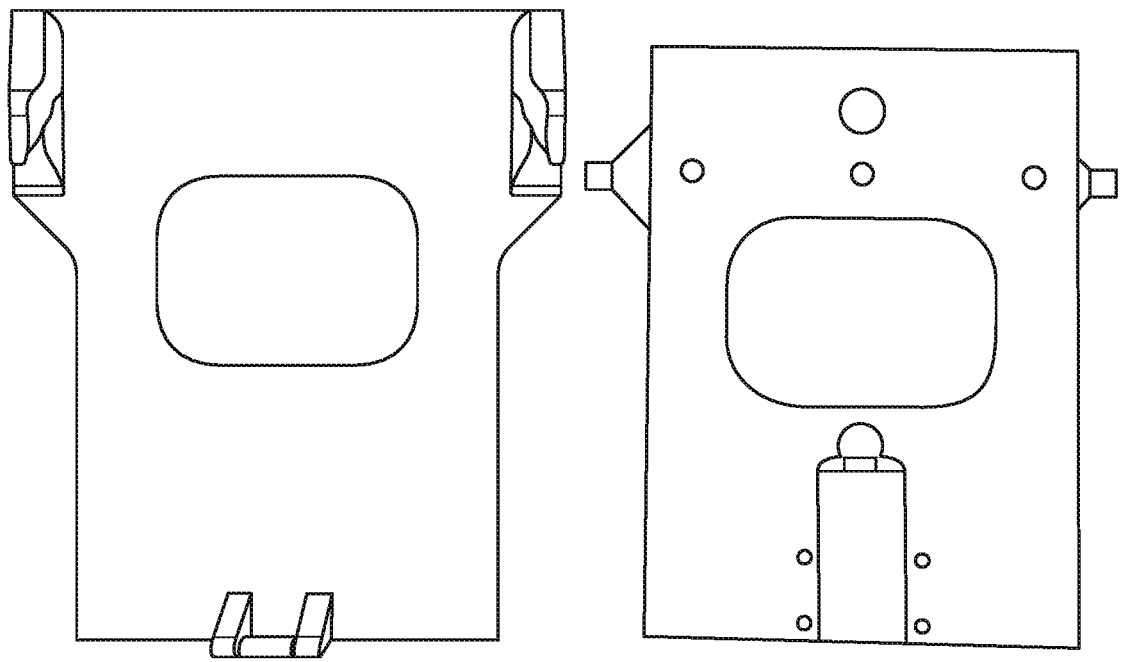
Figure 10F:
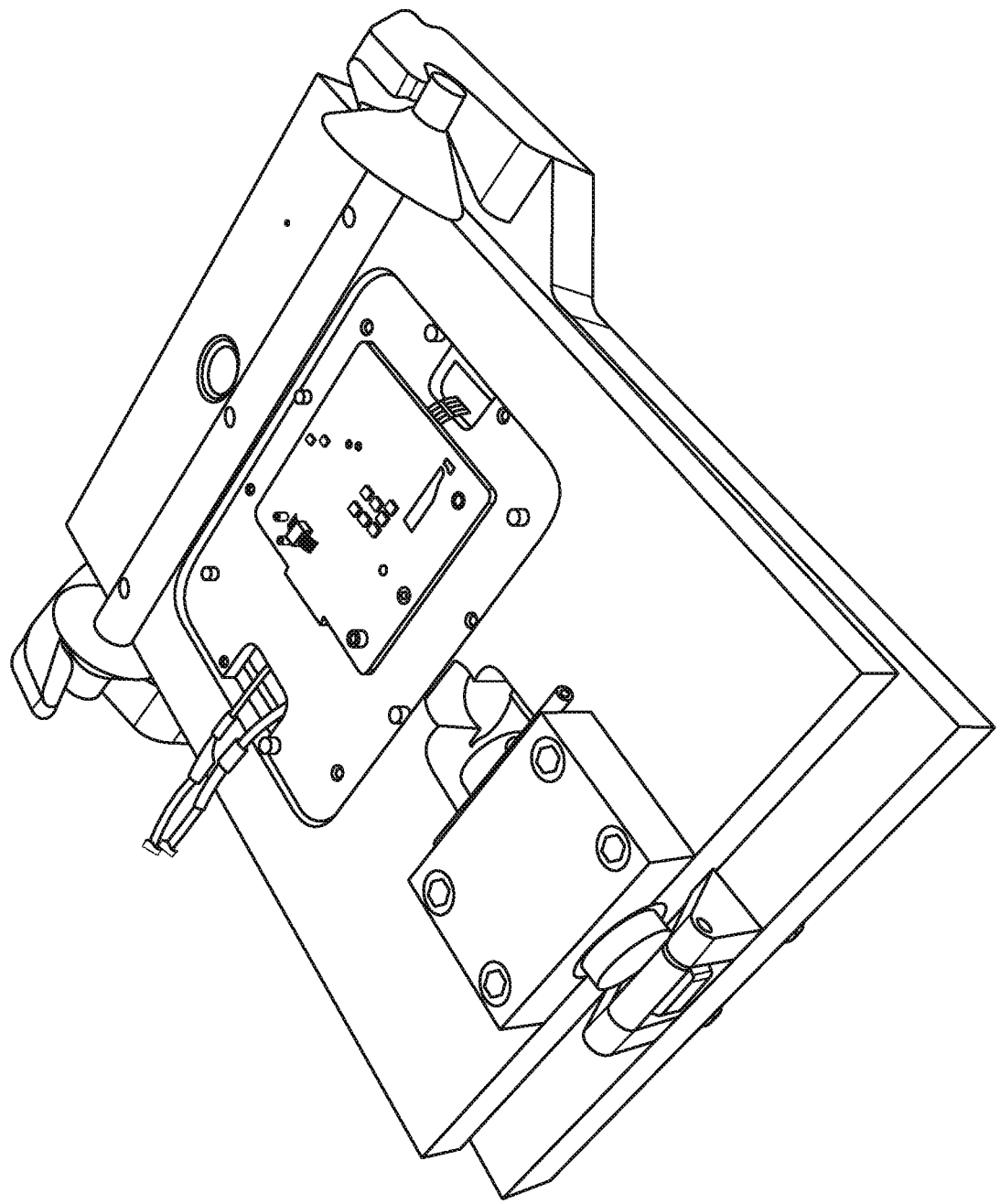
Figure 10G:
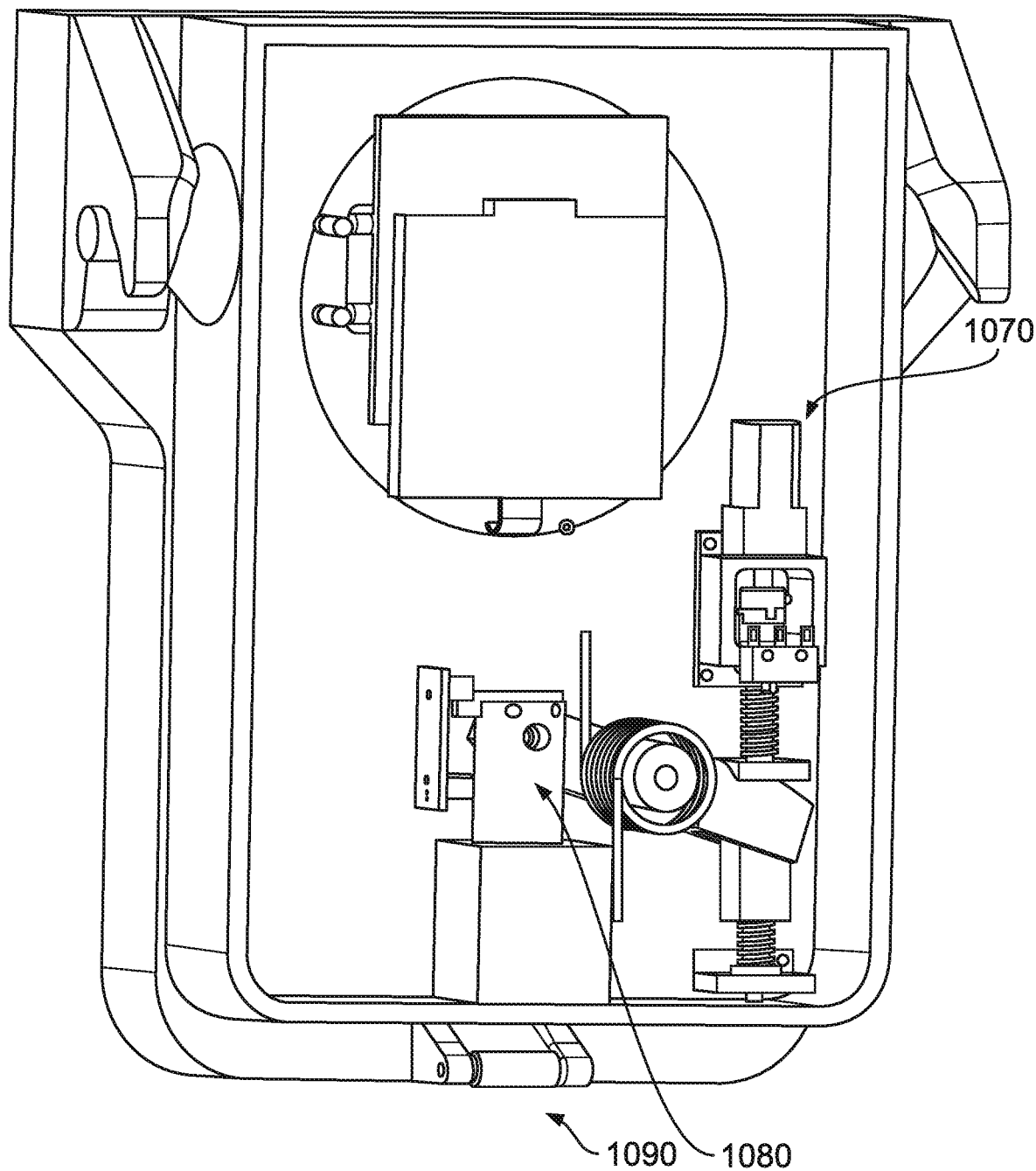

Illustrative front and rear views of exemplary mechanical subsystems of the host interface and the client interface are shown in FIGS. 10D and 10E. For example, the client interface and the host interface shown in FIGS. 10D and 10E include alignment features for positioning the client device associated with the client interface and the host interface (e.g., on a hub device or mast structure). In a more particular example, when installing a client device having a suitable client interface, the ear-shaped alignment features of the client interface can be positioned to hang from the protruding alignment features of the host interface. Illustrative examples of the aligned client interface and host interface are shown in FIGS. 10F and 10G.

Figure 11B:
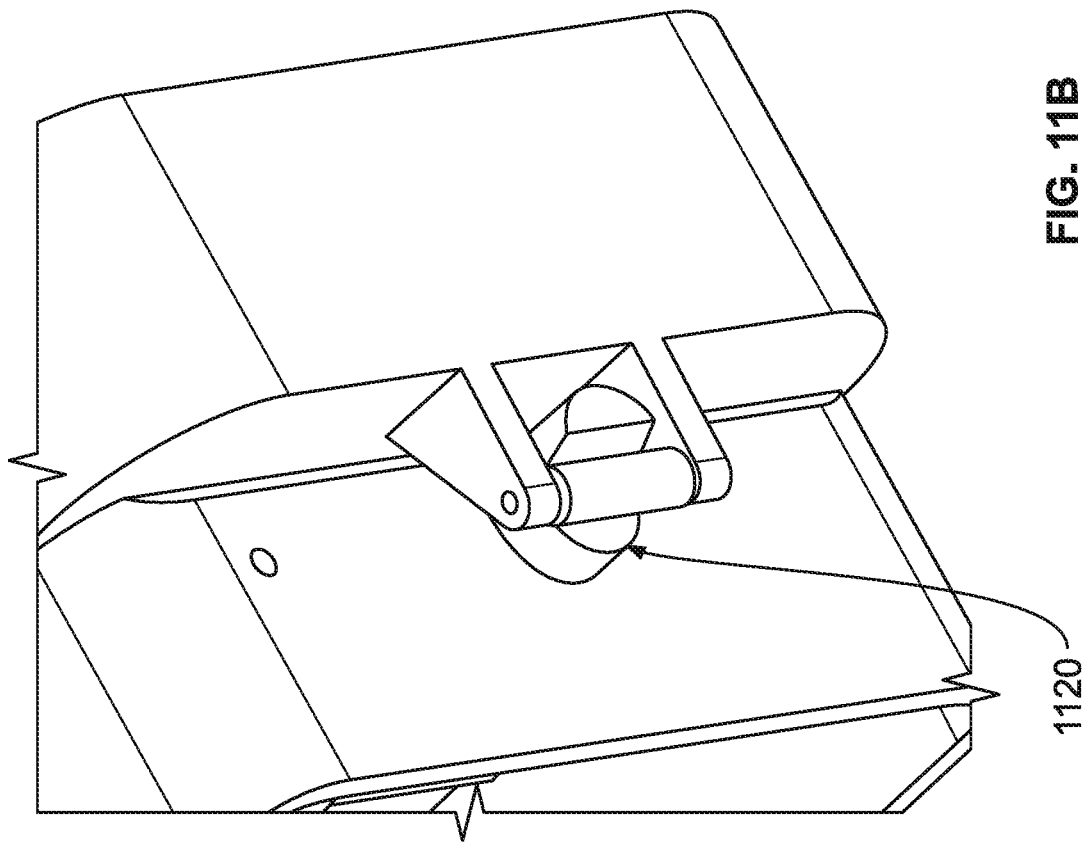
FIGS. 11A and 11B show illustrative examples of a recessed latch for connecting a host interface with a client interface in accordance with some embodiments of the disclosed subject matter.
Figure 11A:
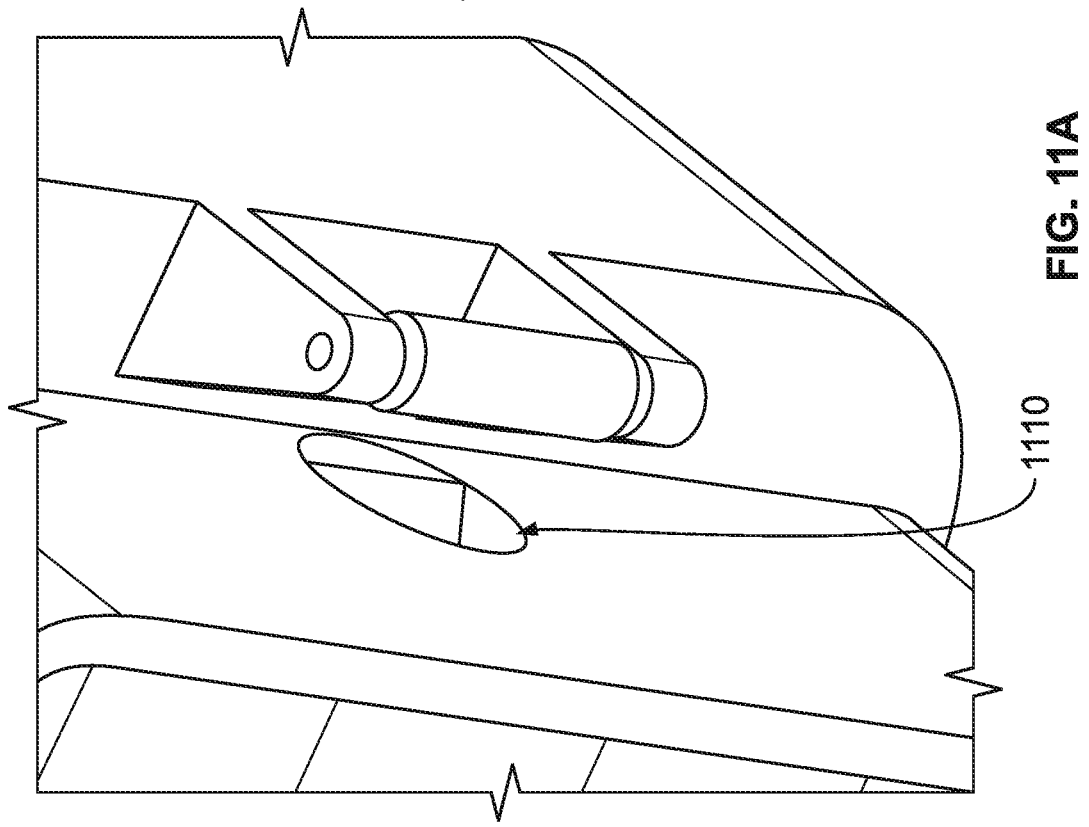

In some embodiments, the latch of puck element 600 can be recessed within puck element 600. For example, as shown in FIG. 11A, a latch can be initially positioned within a recess 1110 within puck element 600. In continuing this example, as shown in FIG. 11B, latch 1120 can be actuated to protrude from puck element 600 and connect with a corresponding latch element on client interface 120.

It should be noted that, in some embodiments, a failsafe latch can be held in position by a spring in which a motor or a manual release may be needed to unlock the latch.

In accordance with some embodiments of the disclosed subject matter, multiple client devices can be installed in an outdoor environment in any suitable manner.

For example, in some embodiments, a request can be received by a device installation management system, where the request includes a client device of a particular device type for installation at a particular location. In a more particular example, a server executing a device installation management application can receive a request to install an air quality sensor at a particular street intersection. In response, the server executing the device installation management application can transmit an instruction to a corresponding human operator to install the requested client device at a mast, a utility pole, or any other suitable static structure at the requested location. In another example, the request can indicate that a currently installed client device at the requested location should be removed and/or replaced.

In some embodiments, as shown in FIGS. 12A-12B and 13A-13E, the server executing the device installation management application can transmit an instruction to a drone delivery service, where a drone is dispatched to deliver and install the requested client device at the requested location. For example, as described above in connection with FIGS. 10A-10G, a drone carrying a client device having a client interface can be aligned with a puck element on a host interface at the requested location. In an implementation in which the puck element is configured to be positioned at a particular angle (e.g., 45 degrees), a drone can place the client device having the client interface on the surface of the puck element and the server can transmit a locking instruction to a locking mechanism, electromagnetic actuator, or any other suitable mechanism that securely attaches the client device to the host interface. In another example, the server can transmit an instruction to a drone delivery service, where a drone is dispatched to remove a client device that is currently installed at a host interface.

Figure 12A:
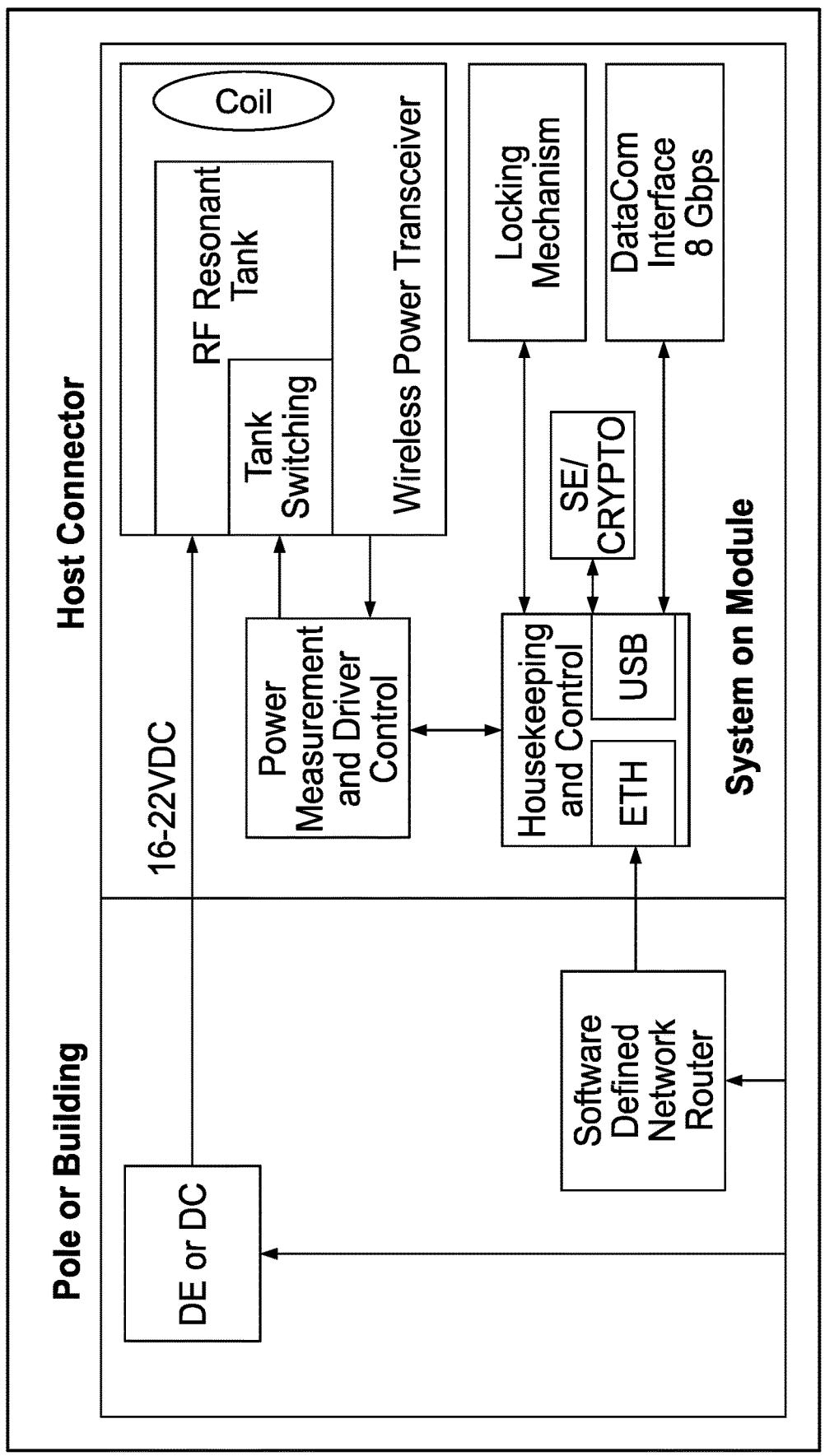
FIGS. 12A-12B and 13A-13E show illustrative examples of multiple client devices that have been connected to host interfaces of a hub device positioned on a mast, where the client devices have been provided for installation with each host interface using a drone in accordance with some embodiments of the disclosed subject matter.
Figure 12B:
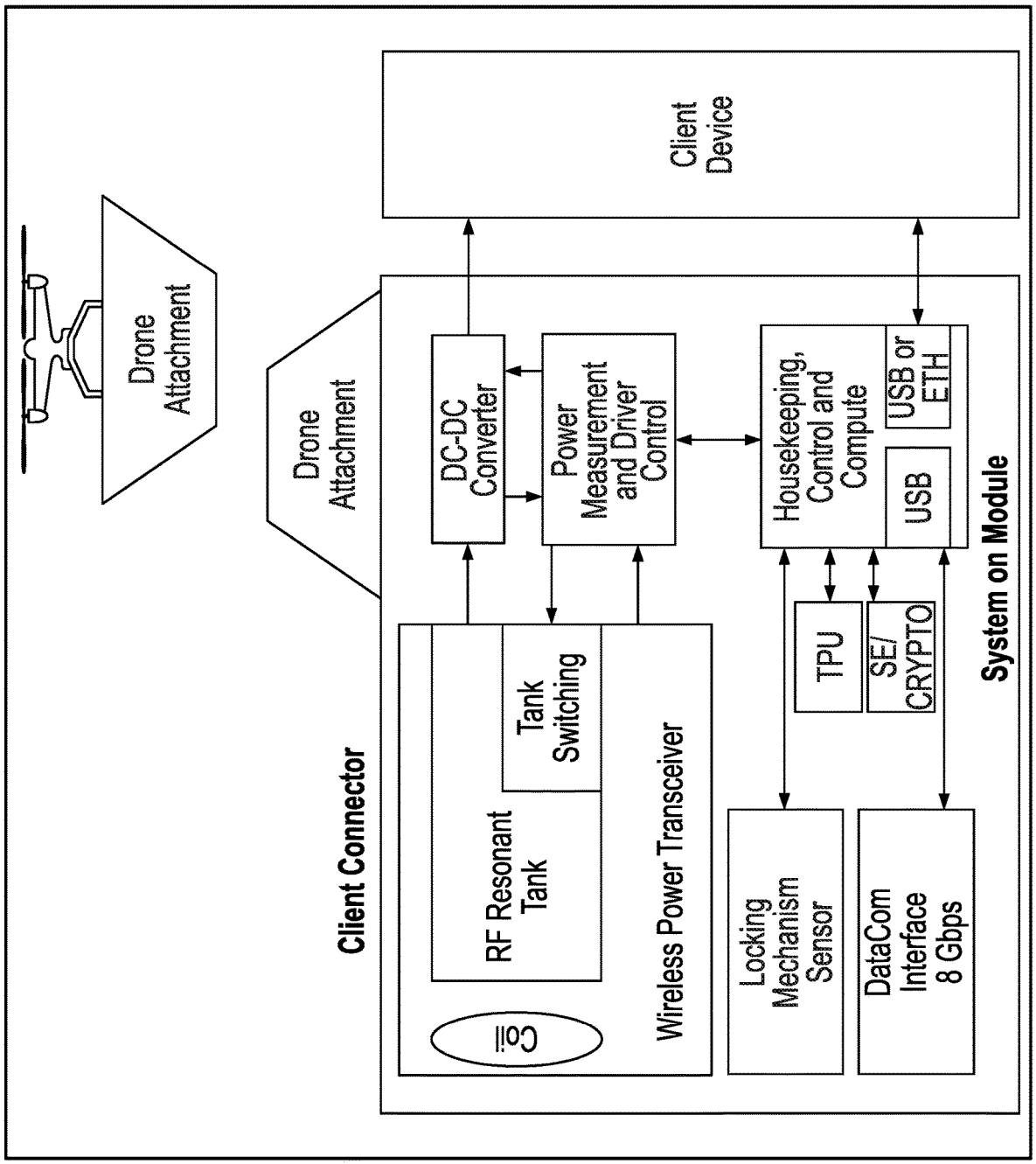
Figure 13A:
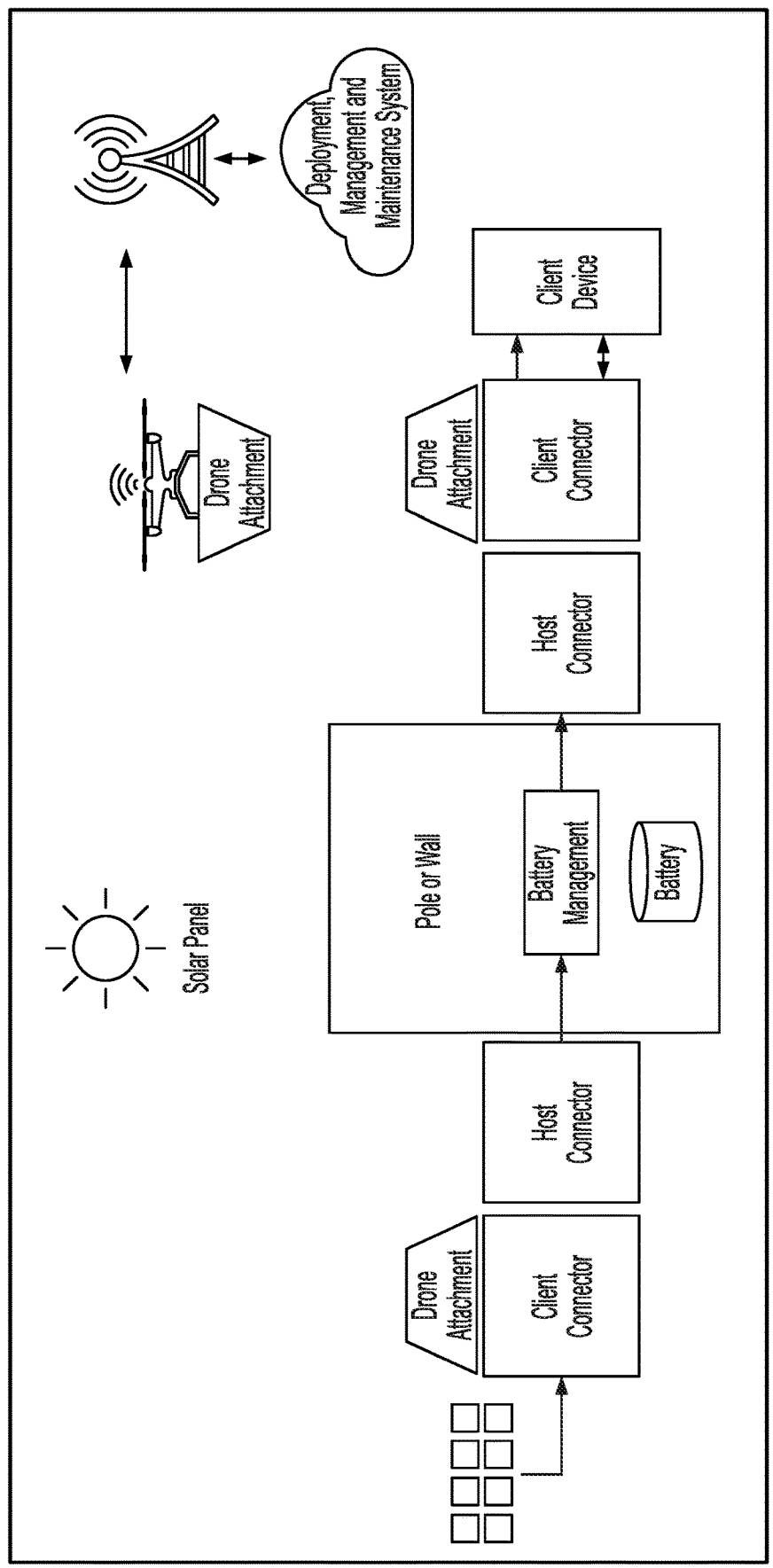
Figure 13B:
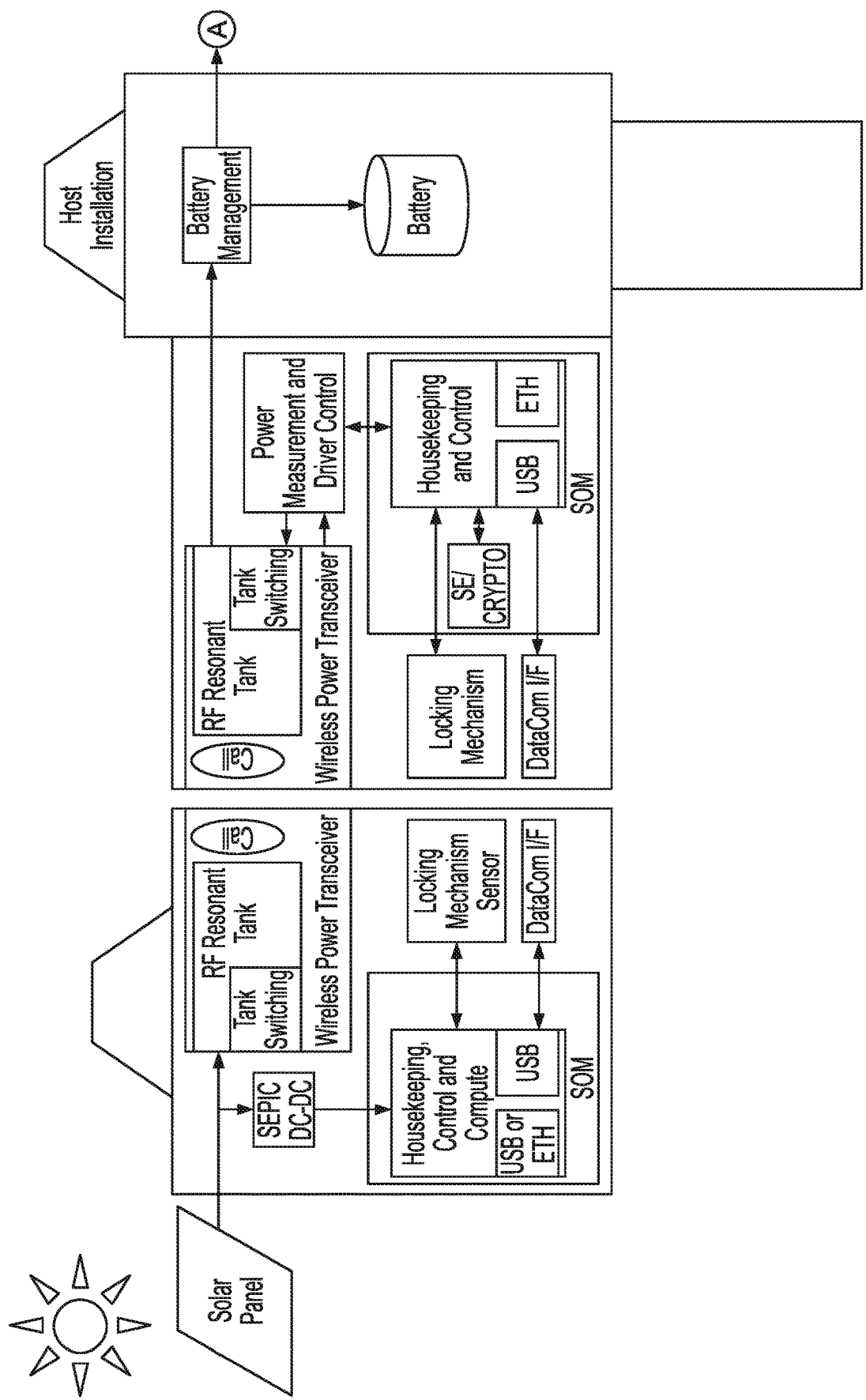
Figure 13C:
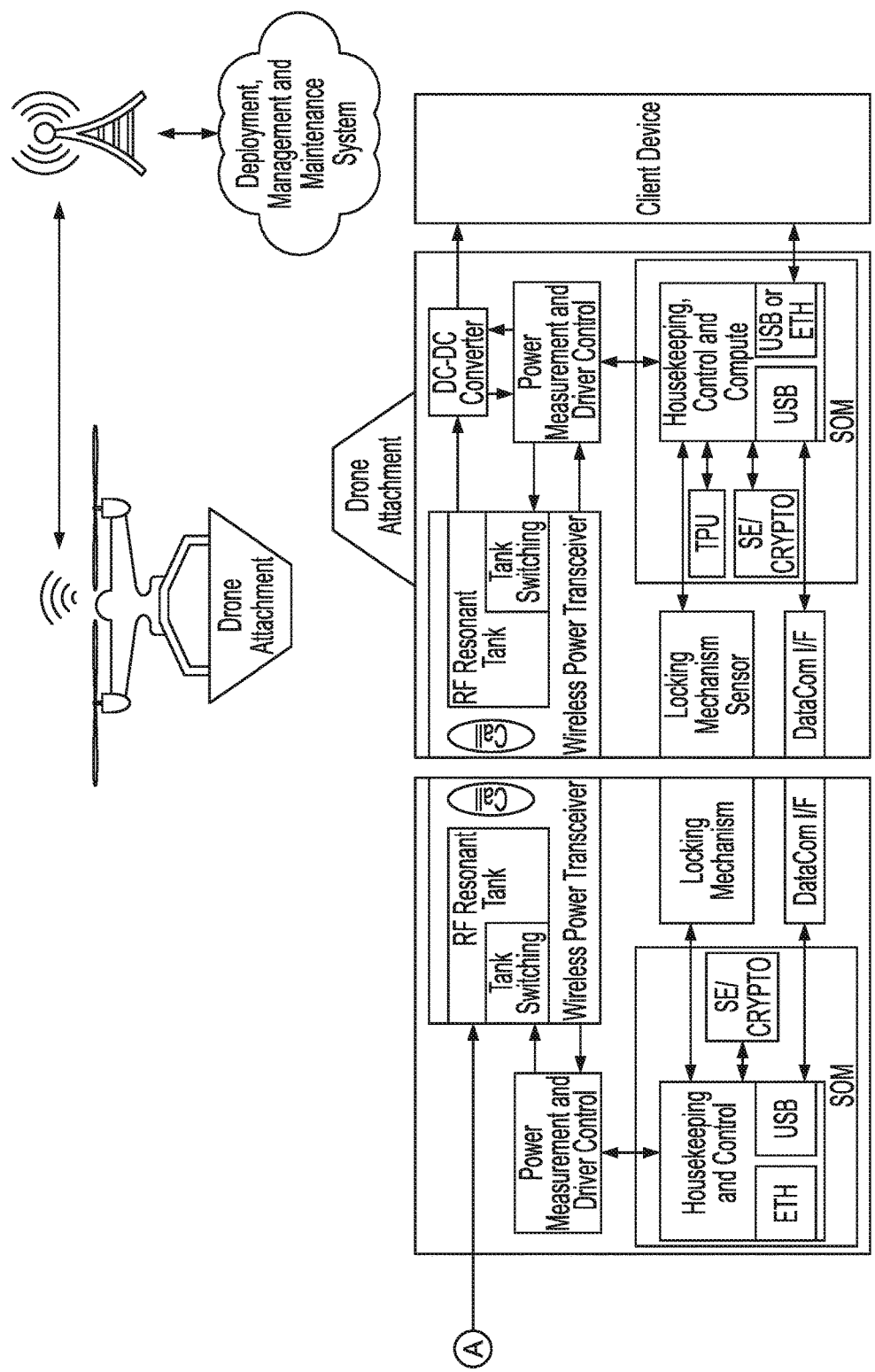
Figure 13D:
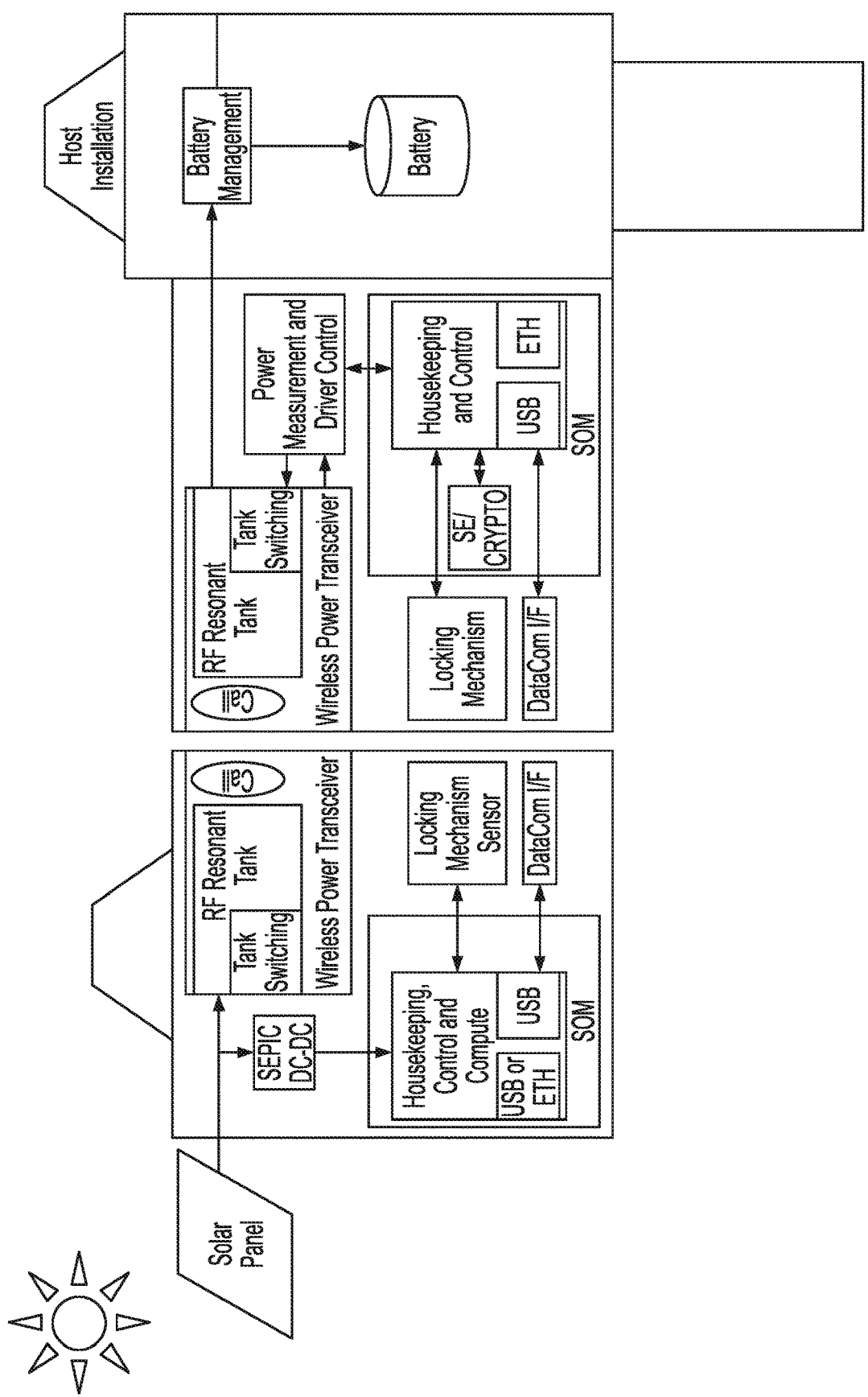
Figure 13E:
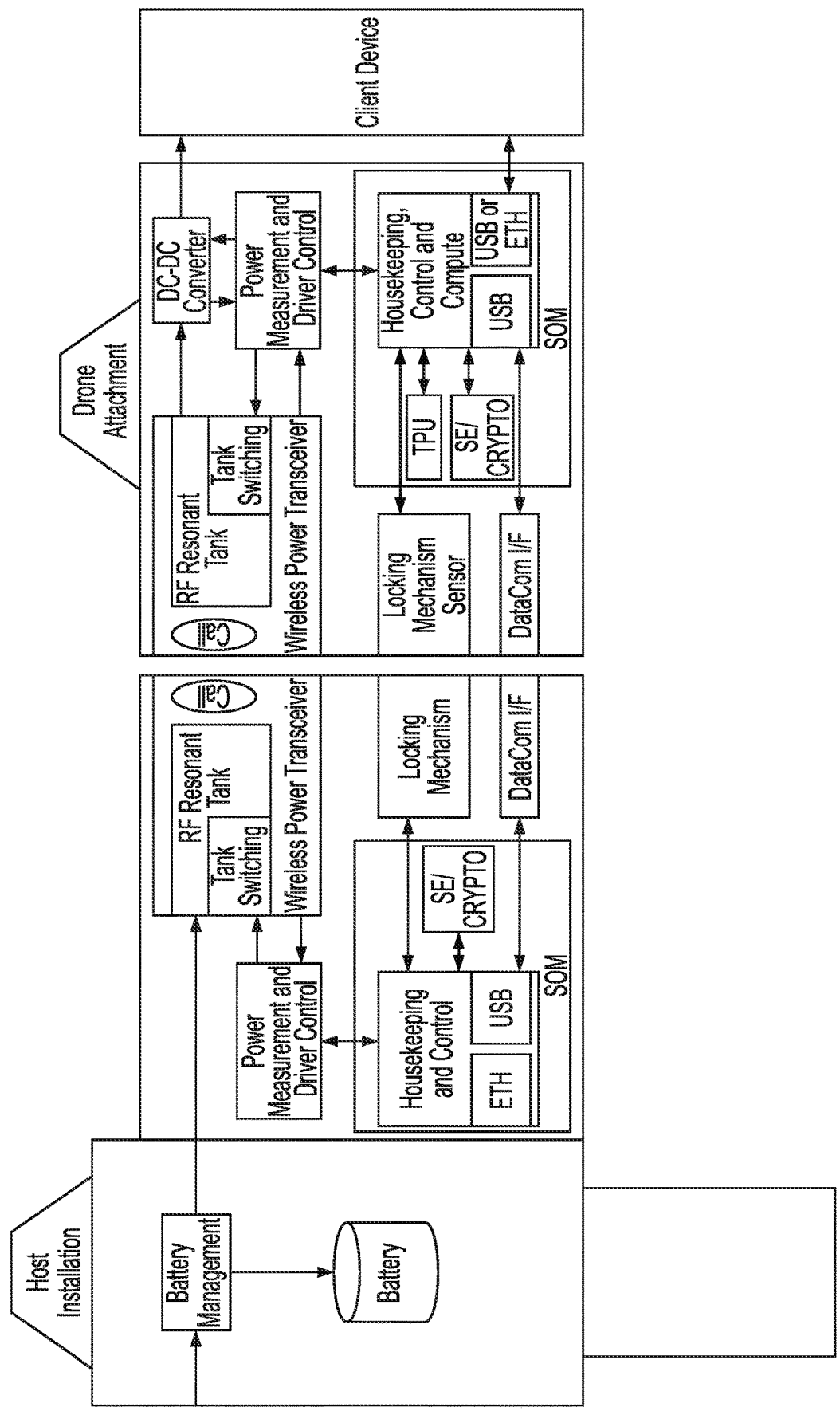

It should be noted that, as shown in FIGS. 12A and 12B, a client interface that is connected to a client device for installation at a host interface can include any suitable drone attachment mechanism such that a drone having a corresponding attachment mechanism can attach and release any suitable client device. As shown in FIGS. 13A and 13B, drone attachments can be configured on any suitable device, such as hub device 150. For example, upon installing multiple masts throughout an outdoor environment, a drone delivery service can be used to install and/or replace hub devices—e.g., a hub device having one host interface with a hub device having five host interfaces; a hub device having a host interface for receiving only one type of client device, such as a lighting device with a hub device having host interfaces that are capable of receiving different types of client devices; removing an operational hub device at a location having less priority for the capabilities provided by the attached client devices, such as lighting devices and traffic monitoring devices, and replacing a hub device needing repair or analysis with the operational hub device at a location having greater need; etc.

Figure 14:
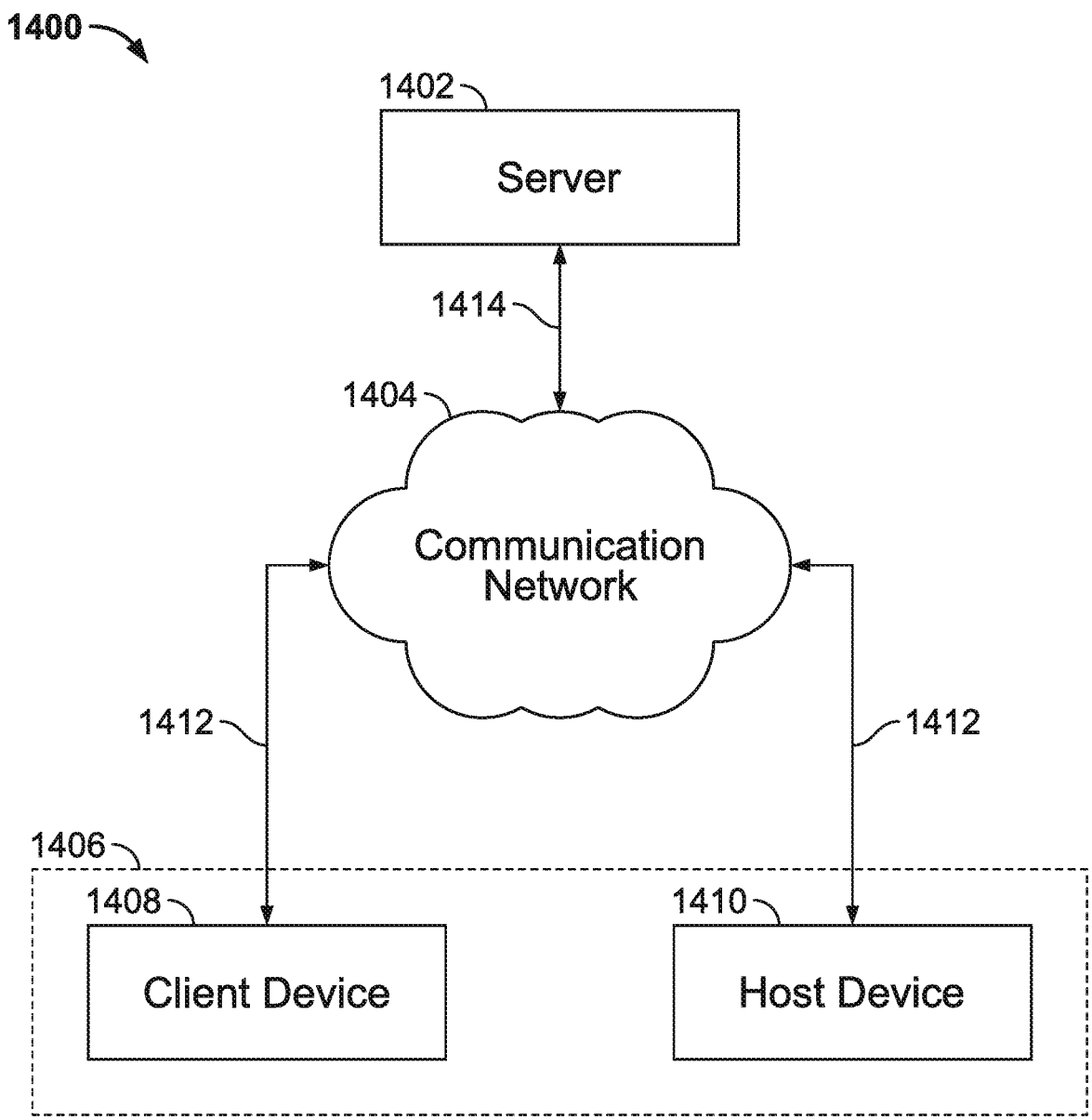
FIG. 14 shows a schematic diagram of an illustrative system suitable for implementation of mechanisms described herein for identifying and managing the installation of user devices in accordance with some embodiments of the disclosed subject matter.
Figure 15:
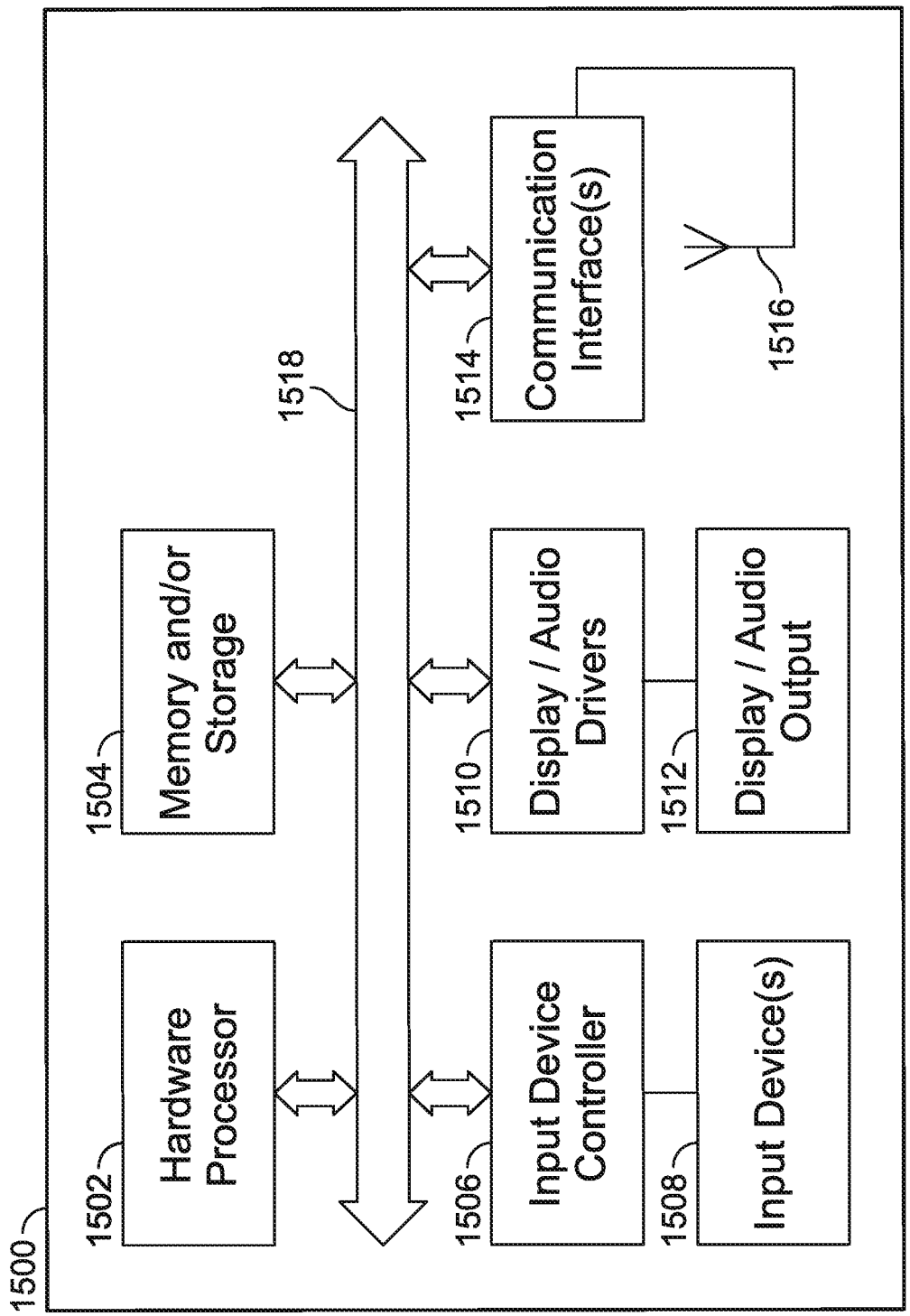
FIG. 15 shows a detailed example of hardware that can be used in a server and/or a user device of FIG. 14 in accordance with some embodiments of the disclosed subject matter.

Turning to FIG. 14, an example 1400 of hardware for identifying and managing client devices in an outdoor environment that can be used in accordance with some embodiments of the disclosed subject matter is shown. As illustrated, hardware 1400 can include a server 1402, a communication network 1404, and/or one or more user devices 1406, such as a client device 1408 (having a client interface) and a host device 1410 (having a host interface).

Server 1402 can be any suitable server(s) for storing information, data, programs, and/or any other suitable content. For example, in some embodiments, server 1402 can store any suitable map information, such as information indicating the locations of particular client devices, the locations of hub devices or host devices that are capable of receiving a client device, etc. In some embodiments, server 1402 can execute any suitable functions for initiating and managing the installation of a client device in the outdoor environment. For example, as described above in connection with FIGS. 12, 13A, 13B, and 13C, server 1402 can transmit an instruction to a drone delivery service, where a drone is dispatched to deliver and install a requested client device at a host interface of a requested location. In another example, server 1402 can transmit a locking instruction to a locking mechanism an electromagnetic actuator, or any other suitable mechanism within a host interface that causes the locking mechanisms to actuate and securely attaches the client device to the host interface. In yet another example, server 1402 can transmit an instruction to a drone delivery service, where a drone is dispatched to remove a client device that is currently installed at a host interface.

Communication network 1404 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 1406 can be connected by one or more communications links (e.g., communications links 1412) to communication network 1404 that can be linked via one or more communications links (e.g., communications links 1414) to server 1402. The communications links can be any communications links suitable for communicating data among user devices 1406 and server 1402 such as network links, dial-up links, wireless links, hard-wired links, any other suitable communications links, or any suitable combination of such links.

User devices 1406, which can include client devices 1408, can include any one or more user devices for deployment within the outdoor environment. Examples of client devices 1408 that can be used with the device installation mechanisms described herein are sensor devices (e.g., an air quality sensing device, a temperature sensing device, a pressure sensing device, a sound or noise sensing device, a light sensing device, a humidity sensing device, etc.), lighting devices, camera or imaging devices (e.g., an outdoor camera, an infrared imaging device, a thermal imaging device, a LIDAR imaging device, etc.), display devices (e.g., an outdoor LED display device, a double-sided display device, etc.), and/or communications devices (e.g., a Wi-Fi access point, a wireless backhaul system, etc.).

Although server 1402 is illustrated as one device, the functions performed by server 1402 can be performed using any suitable number of devices in some embodiments. For example, in some embodiments, multiple devices can be used to implement the functions performed by server 1402.

Although user devices 1408 and 1410 are shown in FIG. 14 to avoid over-complicating the figure, any suitable number of user devices, any suitable number of client devices, any suitable number of host devices, any suitable number of hub devices, and/or any suitable types of user devices can be used in some embodiments.

Server 1402 and user devices 1406 can be implemented using any suitable hardware in some embodiments. For example, in some embodiments, devices 1402 and 1406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 1500 of FIG. 15, such hardware can include hardware processor 1502, memory and/or storage 1504, an input device controller 1506, an input device 1508, display/audio drivers 1510, display and audio output circuitry 1512, communication interface(s) 1514, an antenna 1516, and a bus 1518.

Hardware processor 1502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 1502 can be controlled by a server program stored in memory and/or storage of a server, such as server 1402. In some embodiments, hardware processor 1502 can be controlled by a computer program stored in memory and/or storage of a user device, such as user device 1406.

Memory and/or storage 1504 can be any suitable memory and/or storage for storing programs, data, and/or any other suitable information in some embodiments. For example, memory and/or storage 1504 can include random access memory, read-only memory, flash memory, hard disk storage, optical media, and/or any other suitable memory.

Input device controller 1506 can be any suitable circuitry for controlling and receiving input from one or more input devices 1508 in some embodiments. For example, input device controller 1506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 1510 can be any suitable circuitry for controlling and driving output to one or more display/audio output devices 1512 in some embodiments. For example, display/audio drivers 1510 can be circuitry for driving a touchscreen, a flat-panel display, a cathode ray tube display, a projector, a speaker or speakers, and/or any other suitable display and/or presentation devices.

Communication interface(s) 1514 can be any suitable circuitry for interfacing with one or more communication networks (e.g., computer network 1404). For example, interface(s) 1514 can include network interface card circuitry, wireless communication circuitry, and/or any other suitable type of communication network circuitry.

Antenna 1516 can be any suitable one or more antennas for wirelessly communicating with a communication network (e.g., communication network 1404) in some embodiments. In some embodiments, antenna 1416 can be omitted.

Bus 1518 can be any suitable mechanism for communicating between two or more components 1502, 1504, 1506, 1510, and 1514 in some embodiments.

Any other suitable components can be included in hardware 1400 in accordance with some embodiments.

In some embodiments, at least some of the above described blocks of the process of FIG. 1 can be executed or performed in any order or sequence not limited to the order and sequence shown in and described in connection with the figures. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, device installation systems, methods, and media for providing ubiquitous connectivity in outdoor environments are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A device installation system comprising:
   a host connector that includes a controller, a host power subsystem, a host communication subsystem, and a lock; and
   a client connector that is connected to a client device and that is connected to the host connector, wherein the client connector includes a client power subsystem, a client communication subsystem, and a latch;
   wherein the host power subsystem is connected to at least one power source, the client power subsystem is charged by the host power subsystem of the host connector, and the client power subsystem transmits power to the client device;
   wherein the host power subsystem includes power measurement and driver control circuitry configured to determine which of the at least one power source provides power to the client device;
   wherein the controller is configured to transmit a locking instruction to the lock that causes the lock of the host connector to actuate with the latch of the client connector; and
   wherein the client communication subsystem is configured to communicate with the client device such that data from the client device can be communicated over a communications network.

2. The device installation system of claim 1, wherein the client connector is connected to the client device at an end of the client connector and wherein the client connector is connected to the host connector at an opposing end of the client connector.

3. The device installation system of claim 1, further comprising a mast that includes the host connector.

4. The device installation system of claim 3, further comprising a hub device that is connected to the mast, wherein the hub device includes the host connector and one or more additional host connectors.

5. The device installation system of claim 4, wherein the host power subsystem receives power from a power source connected through the mast.

6. The device installation system of claim 4, further comprising a solar panel connected to the mast, wherein at least one of the host power subsystem and the client power subsystem receives converted current output from the solar panel.

7. The device installation system of claim 1, wherein each of the host power subsystem and the client power subsystem include a wireless power transceiver, wherein the wireless power transceiver of the host power subsystem wirelessly charges the wireless power transceiver of the client power subsystem.

8. The device installation system of claim 7, wherein the wireless power transceiver includes an inductive coil assembly, a radio frequency tank circuit, and a tank switching circuit.

9. The device installation system of claim 1, wherein the controller is further configured to detect the presence of the client device and authenticate the client device using the host communication subsystem and the client communication subsystem.

10. The device installation system of claim 9, wherein the controller is further configured to encrypt device information between the host communication subsystem and the client communication subsystem.

11. The device installation system of claim 1, wherein the host connector includes alignment features and the client connector includes corresponding alignment features, wherein the client device and the client connector are positionally aligned with the host connector in response to positioning the alignment features with the corresponding alignment features, and wherein the alignment features of the host connector are angled to slope downward.

12. The device installation system of claim 11, wherein the alignment features of the host connector are protruding alignment features and wherein the corresponding alignment features of the client connector include ear-shaped alignment features that, upon positioning, are configured to hang from the protruding alignment features, and wherein the corresponding alignment features of the client device include roller elements.

13. The device installation system of claim 1, wherein the lock of the host connector comprises a motor and a locking plunger, wherein the controller is further configured to transmit the locking instruction to the motor that causes the motor to actuate the locking plunger, and wherein the locking plunger of the host connector engages with the latch of the client connector.

14. The device installation system of claim 13, wherein the locking plunger is recessed within the host controller.

15. The device installation system of claim 1, further comprising a failsafe latch that unlocks the latch to remove the client connector and the client device from the host connector.

16. The device installation system of claim 1, wherein the client connector further comprises a drone attachment assembly.

17. The device installation system of claim 16, further comprising a deployment system that is configured to deploy an unmanned aerial vehicle to provide the client device to the drone attachment assembly of the client connector.

18. The device installation system of claim 1, further comprising a mast and a hub device that is connected to the mast, wherein the hub device includes a drone attachment assembly.

19. The device installation system of claim 18, further comprising a deployment system that is configured to deploy an unmanned aerial vehicle to provide the host connector to the drone attachment assembly of the hub device.

20. The device installation system of claim 1, wherein the power measurement and drive control circuitry is further configured to determine at least one of the amount of power to the client device, the frequency information, or the power transmission instructions.

* * * * *